(12) United States Patent
Donnelly et al.

(10) Patent No.: US 7,084,602 B2
(45) Date of Patent: Aug. 1, 2006

(54) PREDICTING WHEEL SLIP AND SKID IN A LOCOMOTIVE

(75) Inventors: Frank Wegner Donnelly, North Vancouver (CA); David Herman Swan, Lawrencetown (CA); John David Watson, Evergreen, CO (US)

(73) Assignee: Railpower Technologies Corp., North Vancouver (CA)

( * ) Notice: Subject to any disclaimer, the term of this patent is extended or adjusted under 35 U.S.C. 154(b) by 45 days.

(21) Appl. No.: 11/060,087

(22) Filed: Feb. 16, 2005

(65) Prior Publication Data

US 2005/0189886 A1  Sep. 1, 2005

Related U.S. Application Data

(60) Provisional application No. 60/545,673, filed on Feb. 17, 2004.

(51) Int. Cl.
  *H02P 5/46* (2006.01)
(52) U.S. Cl. .................. 318/807; 318/802; 318/806; 180/65.5; 180/197; 303/177; 701/82; 701/90
(58) Field of Classification Search ................ 318/139, 318/52, 802–809; 180/65.5, 197; 303/177; 701/82, 90
  See application file for complete search history.

(56) References Cited

U.S. PATENT DOCUMENTS

| | | | |
|---|---|---|---|
| 384,580 A | 6/1888 | Julien |
| 1,199,752 A | 10/1916 | Baker |
| 1,377,087 A | 5/1921 | Manns |
| 1,535,175 A | 4/1925 | Mancha |
| 2,403,933 A | 4/1946 | Lillquist |
| 2,472,924 A | 6/1949 | Schwendner |
| 2,510,753 A | 6/1950 | Multhaup |
| 3,169,733 A | 2/1965 | Barrett, Jr. |
| 3,443,115 A | 5/1969 | Timmerman, Jr. |
| 3,569,810 A | 3/1971 | Thiele |
| 3,596,154 A | 7/1971 | Gurwicz et al. |
| 3,668,418 A | 6/1972 | Godard |
| 3,728,596 A | 4/1973 | Hermansson et al. |
| 3,737,745 A | 6/1973 | Chevaugeon et al. |
| 3,792,327 A | 2/1974 | Waldorf |
| 3,832,625 A | 8/1974 | Gyugyi |
| 3,898,937 A | 8/1975 | Johnson |
| 3,930,189 A | 12/1975 | Smith |
| 3,970,160 A | 7/1976 | Nowick |
| 3,982,164 A | 9/1976 | de Buhr |
| 3,997,822 A | 12/1976 | Logston et al. |
| 4,035,698 A | 7/1977 | Soderberg |
| 4,070,562 A | 1/1978 | Kuno et al. |

(Continued)

FOREIGN PATENT DOCUMENTS

CA  1283472  10/1987

(Continued)

OTHER PUBLICATIONS

Thompson, "Electric Transportation," International Textbook Co., Scranton, Pa; (1st Ed., 1940), pp. 254-262.

(Continued)

*Primary Examiner*—Paul Ip
(74) *Attorney, Agent, or Firm*—Sheridan Ross, P.C.

(57) ABSTRACT

The present invention is directed to the termination of the occurrence of wheel slip/skid and prediction and prevention of the onset of wheel slip/skid in a locomotive. In one configuration, a lookup table of adhesion factors is used to predict the occurrence of wheel slip/skid.

42 Claims, 30 Drawing Sheets

U.S. PATENT DOCUMENTS

| | | | |
|---|---|---|---|
| 4,075,538 A | 2/1978 | Plunkett | |
| 4,090,577 A | 5/1978 | Moore | |
| 4,095,147 A | 6/1978 | Mountz | |
| 4,096,423 A | 6/1978 | Bailey et al. | |
| 4,107,402 A | 8/1978 | Dougherty et al. | |
| 4,152,758 A | 5/1979 | Bailey et al. | |
| 4,199,037 A | 4/1980 | White | |
| 4,204,143 A | 5/1980 | Coleman | |
| 4,217,527 A | 8/1980 | Bourke et al. | |
| 4,309,645 A | 1/1982 | De Villeneuve | |
| 4,344,139 A | 8/1982 | Miller et al. | |
| 4,347,569 A | 8/1982 | Allen, Jr. et al. | |
| 4,369,397 A | 1/1983 | Read | |
| 4,417,194 A | 11/1983 | Curtiss et al. | |
| 4,423,362 A | 12/1983 | Konrad et al. | |
| 4,471,276 A | 9/1984 | Cudlitz | |
| 4,471,421 A | 9/1984 | Brown et al. | |
| 4,495,449 A | 1/1985 | Black et al. | |
| 4,523,134 A | 6/1985 | Kinoshita et al. | |
| 4,644,232 A | 2/1987 | Nojiri et al. | |
| 4,701,682 A | 10/1987 | Hirotsu et al. | |
| 4,799,161 A | 1/1989 | Hirotsu et al. | |
| 4,900,944 A | 2/1990 | Donnelly | |
| 4,936,610 A | 6/1990 | Kumar et al. | |
| 4,941,099 A | 7/1990 | Woody et al. | |
| 4,944,539 A | 7/1990 | Kumar et al. | |
| 4,950,964 A | 8/1990 | Evans | |
| 4,961,151 A | 10/1990 | Early et al. | |
| 5,129,328 A | 7/1992 | Donnelly | |
| 5,212,431 A | 5/1993 | Origuchi et al. | |
| 5,248,926 A * | 9/1993 | Kotake et al. | 318/807 |
| 5,264,764 A | 11/1993 | Kuang | |
| 5,281,900 A | 1/1994 | Park | |
| 5,289,093 A | 2/1994 | Jobard | |
| 5,317,669 A | 5/1994 | Anderson et al. | |
| 5,332,630 A | 7/1994 | Hsu | |
| 5,359,228 A | 10/1994 | Yoshida | |
| 5,392,716 A | 2/1995 | Orschek et al. | |
| 5,428,538 A | 6/1995 | Ferri | |
| 5,436,538 A | 7/1995 | Garvey et al. | |
| 5,436,548 A | 7/1995 | Thomas | |
| 5,453,672 A | 9/1995 | Avitan | |
| 5,480,220 A | 1/1996 | Kumar | |
| 5,508,924 A * | 4/1996 | Yamashita | 701/22 |
| 5,510,203 A | 4/1996 | Shinji et al. | |
| 5,510,693 A | 4/1996 | Theobald | |
| 5,511,749 A | 4/1996 | Horst et al. | |
| 5,528,148 A | 6/1996 | Rogers | |
| 5,564,795 A | 10/1996 | Engle | |
| 5,568,023 A | 10/1996 | Grayer et al. | |
| 5,580,677 A | 12/1996 | Nobuyasu | |
| 5,580,685 A | 12/1996 | Schenk et al. | |
| 5,585,706 A | 12/1996 | Avitan | |
| 5,589,743 A | 12/1996 | King | |
| 5,610,499 A | 3/1997 | Rogers | |
| 5,610,819 A | 3/1997 | Mann et al. | |
| 5,629,567 A * | 5/1997 | Kumar | 290/3 |
| 5,629,601 A | 5/1997 | Feldstein | |
| 5,631,532 A | 5/1997 | Azuma et al. | |
| 5,646,510 A * | 7/1997 | Kumar | 322/16 |
| 5,659,240 A | 8/1997 | King | |
| 5,661,378 A | 8/1997 | Hapeman | |
| 5,685,507 A | 11/1997 | Horst et al. | |
| 5,696,438 A | 12/1997 | Hamilton | |
| 5,698,955 A | 12/1997 | Nii | |
| 5,735,215 A | 4/1998 | Tegeler | |
| 5,751,137 A | 5/1998 | Kiuchi et al. | |
| 5,765,656 A | 6/1998 | Weaver | |
| 5,820,172 A | 10/1998 | Brigham et al. | |
| 5,898,281 A * | 4/1999 | Bossoney et al. | 318/52 |
| 5,898,282 A | 4/1999 | Drozdz et al. | |
| 5,939,861 A | 8/1999 | Joko et al. | |
| 5,964,309 A | 10/1999 | Kimura et al. | |
| 5,992,950 A | 11/1999 | Kumar et al. | |
| 5,998,880 A * | 12/1999 | Kumar | 290/40 B |
| 6,012,011 A | 1/2000 | Johnson | |
| 6,021,251 A | 2/2000 | Hammer et al. | |
| 6,023,137 A | 2/2000 | Kumar et al. | |
| 6,082,834 A * | 7/2000 | Kolbe et al. | 303/139 |
| 6,104,148 A | 8/2000 | Kumar et al. | |
| 6,175,272 B1 | 1/2001 | Takita | |
| 6,208,097 B1 | 3/2001 | Reddy et al. | |
| 6,211,646 B1 | 4/2001 | Katsumi | |
| 6,274,998 B1 * | 8/2001 | Kaneko et al. | 318/802 |
| 6,308,639 B1 | 10/2001 | Donnelly et al. | |
| 6,331,365 B1 | 12/2001 | King | |
| 6,367,891 B1 | 4/2002 | Smith et al. | |
| 6,371,573 B1 * | 4/2002 | Goebels et al. | 303/113.1 |
| 6,405,705 B1 * | 6/2002 | Dunsworth et al. | 123/305 |
| 6,441,581 B1 | 8/2002 | King et al. | |
| 6,449,536 B1 | 9/2002 | Brousseau et al. | |
| 6,456,674 B1 | 9/2002 | Horst et al. | |
| D464,622 S | 10/2002 | Donnelly | |
| 6,470,245 B1 | 10/2002 | Proulx | |
| 6,591,758 B1 | 7/2003 | Kumar | |
| 6,611,116 B1 * | 8/2003 | Bachman et al. | 318/139 |
| 6,612,245 B1 | 9/2003 | Kumar et al. | |
| 6,612,246 B1 | 9/2003 | Kumar | |
| 6,615,118 B1 | 9/2003 | Kumar | |
| 6,627,345 B1 | 9/2003 | Zemlok et al. | |
| 6,634,303 B1 | 10/2003 | Madsen et al. | |
| 6,653,002 B1 | 11/2003 | Ronald | |
| 6,658,331 B1 | 12/2003 | Horst et al. | |
| 6,691,005 B1 | 2/2004 | Proulx | |
| 6,697,716 B1 | 2/2004 | Horst | |
| 6,737,822 B1 | 5/2004 | King | |
| 6,812,656 B1 * | 11/2004 | Donnelly et al. | 318/66 |
| 6,823,835 B1 * | 11/2004 | Dunsworth et al. | 123/305 |
| 6,879,054 B1 | 4/2005 | Gosselin | |
| 6,909,200 B1 | 6/2005 | Bouchon | |
| 2002/0005304 A1 * | 1/2002 | Bachman et al. | 180/65.3 |
| 2003/0150352 A1 | 8/2003 | Kumar | |
| 2003/0151387 A1 | 8/2003 | Kumar | |
| 2003/0160586 A1 * | 8/2003 | Donnelly et al. | 318/684 |
| 2003/0216850 A1 * | 11/2003 | Trefzer et al. | 701/82 |
| 2003/0233959 A1 | 12/2003 | Kumar | |
| 2004/0162696 A1 * | 8/2004 | Kumar | 702/132 |
| 2005/0024001 A1 | 2/2005 | Donnelly et al. | |
| 2005/0045058 A1 | 3/2005 | Donnelly et al. | |

FOREIGN PATENT DOCUMENTS

| | | |
|---|---|---|
| CA | 2411132 | 11/2002 |
| EP | 0 348 938 | 1/1990 |
| GB | 873167 | 3/1960 |
| GB | 1129709 | 11/1966 |
| GB | 1 312 699 | 10/1970 |
| GB | 2 005 205 A | 9/1977 |
| WO | WO 03/072388 | 9/2003 |
| WO | WO 04/042890 | 5/2004 |

OTHER PUBLICATIONS

Mendler, "The Technological Opportunities of Hybrid Electric Vehicles," *Society of Automotive Engineers, Inc.* (1996), pp. 1-16.

Mercer, "Innovative Use of Horsepower—Hybrid Bus Powered by Gas Turbine," *Diesel Progress* (Dec. 1997), pp. 56-57.

Berg, "Concept Truck Addresses Future Clean Air Demands With Hybrid Turbine-Electric Powertrain," *Emissions Alternatives Fuels* (date unknown), pp. 55-57.

"Introducing the FMTV with HybriDrive Propulsion System," pp. 1-3, no date.

Nene, "Advanced Propulsion Systems for Urban Rail Vehicles: Chapter 2: DC Drives with a Chopper Controller," Prentice-Hall, Inc. (1985), pp. 18-45.

Kostic et al., "An Analytic Solution of the Choppers Ripple Currents," Proceedings of the 1993 IEEE/ASME Joint Railroad Conference, Apr. 1993, pp. 103-107.

Declaration of Ronald Bailey under 37 CFR § 1.98 dated Dec. 3, 2004 for U.S. Appl. No. 10/650,011, 3 pages.

Band, C.E. et al., "Development of and Operational Experience with a High Powered D.C. Chopper for 1500 Volt D.C. Railway Equipment," Institution of Electrical Engineers Conference Publication 53 on Power Thyristors and Their Applications, Part 1 May 1969), pp. 277-288.

M.J. Hapeman et al., "Diesel Electric Locomotive Propulsion Systems—A Look into the Future," IEEE Technical Papers Presented at the 1985 Joint ASME/IEEE Railroad Conference, New York City, NY, Apr. 16-18, 1985, pp. 108-115.

Declaration of Ronald Bailey under 37 CFR § 1.98 dated Dec. 3, 2004 for U.S. Appl. No. 10/650,011, 3 pages.

Declaration of Frank Donnelly Under 37 CFR § 1.98 dated Apr. 4, 2004 for U.S. Appl. No. 10/650,011.

U.S. Appl. No. 60/600,330, filed Aug. 9, 2004, Donnelly.
U.S. Appl. No. 60/607,194, filed Sep. 3, 2004, Donnelly.
U.S. Appl. No. 60/616,173, filed Oct. 4, 2004, Donnelly.
U.S. Appl. No. 60/618,631, filed Oct. 13, 2004, Donnelly.
U.S. Appl. No. 60/616,632, filed Oct. 13, 2004, Donnelly.
U.S. Appl. No. 60/674,837, filed Apr. 25, 2005, Donnelly.

"Lead-Acid Battery State of Charge vs. Voltage", Richard Perez, Home Power #36, Aug./Sep. 1993.

"Thermal Evaluation of the Honda Insight Battery Pack" M.D. Zolot et al. National Renewable Energy Laboratory, Presented at the 36th Intersociety Energy Conversion Engineering Conference, Savannah Georgia, Jul. 29 to Aug. 2, 2001.

"Development of a New Battery System for Hybrid Vehicle", Tomokazu Yamauchi et al, Toyota, presented at the EVS 17 in Montreal, Oct. 2000.

"Supercapacitive Energy Storage for Diesel-Electric Locomotives", Destraz, Barrade and Rufer, Swiss Federal Institute of Technology, paper presented at SPEEDAM 2004, Jun. 16, Capri, Italy.

Press Release: "French Railway Company Voles Ferees Legeres et Industielles (VFLI) Puts Its Trust in Deutch Engines", Jun. 2003.

"LNG as a Fuel for Railroads: Assessment of Technology Status and Economics", Pera and Moyer, Acurex Corporation, 1993, Gas Research Institute contract No. 5091-292-2153.

"Comparative Economic Assessment of a Natural Gas Fueled Locomotive with On-Board CNG Storage to Diesel and LNG Variants", Donnelly et al, IEEE/ASME Joint Railroad Conference, Baltimore, Apr. 1995.

"Linear/Switchmode Voltage Regulator Handbook" Motorola, Inc. 1982.

"The Control of Switched Reluctance Drives and their Use for Flywheel Energy Storage", Brabandere et al.

"Performance and Control of the Switched Reluctance Motor", Dehdah et al, University of Western Sydney, Australia.

Design of Switched Reluctance Motors and Development of a Universal Controller for Switched Reluctance and Permanent Magnet Brushless DC Motors', Phd Dissertation, Virginia Polytechnic Institute and State University, Prahveen Vijayraghavan, Blacksburg, VA, Nov. 2001.

"Li-Ion Battery-Powered Buck-Boost Regulator Minimizes Portable Product Size", Chan, IlC-China/ESC-China Conference Proceedings, 2002.

Joseph Szymborski et al., "Examination of VRLA Battery Cells sampled from the Metlakatta Battery Energy Storage System", 15 pages.

"Locomotive Energy Storage System," Advanced Railway Technology, Inc. (Dec. 1985), 22 pages.

* cited by examiner

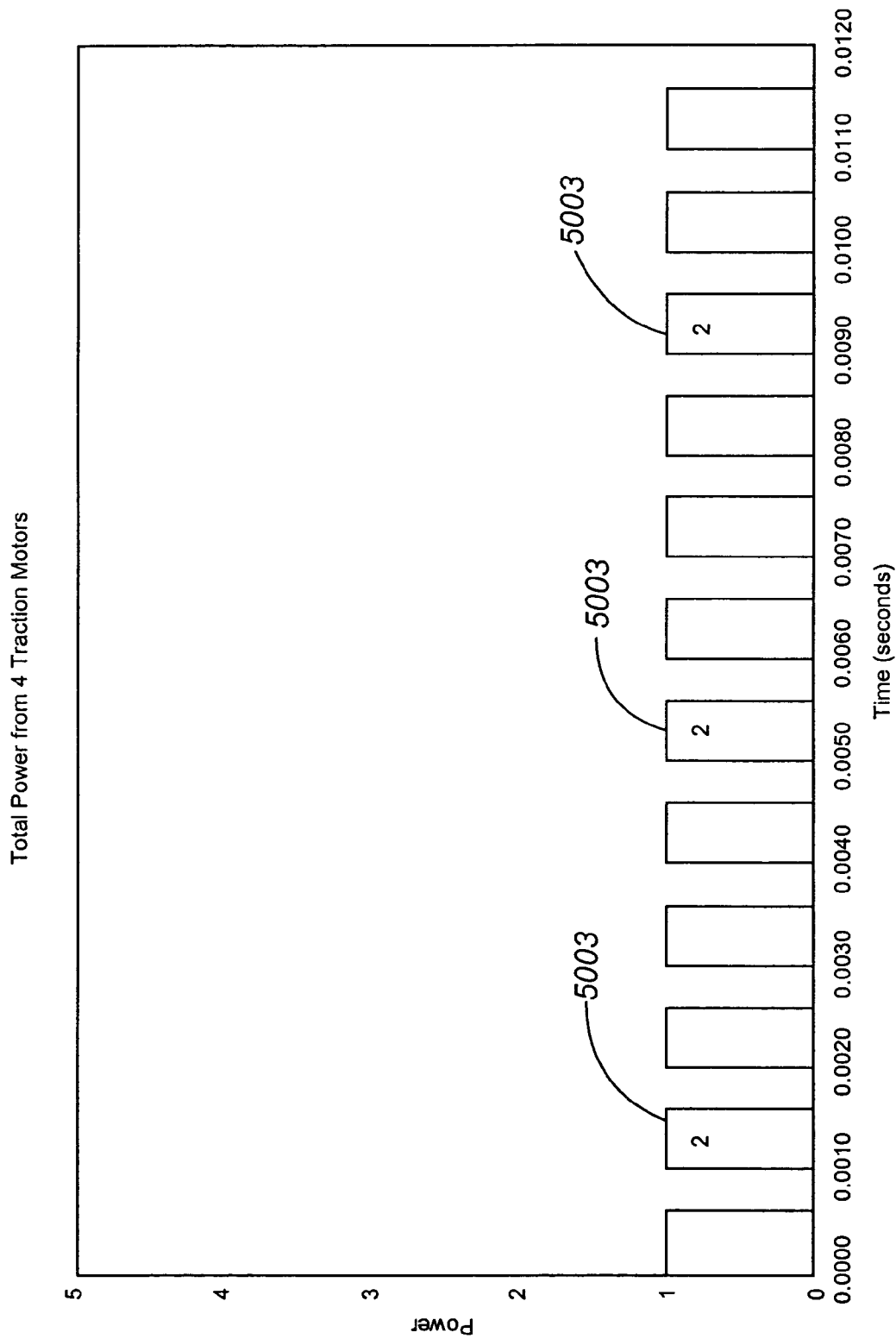

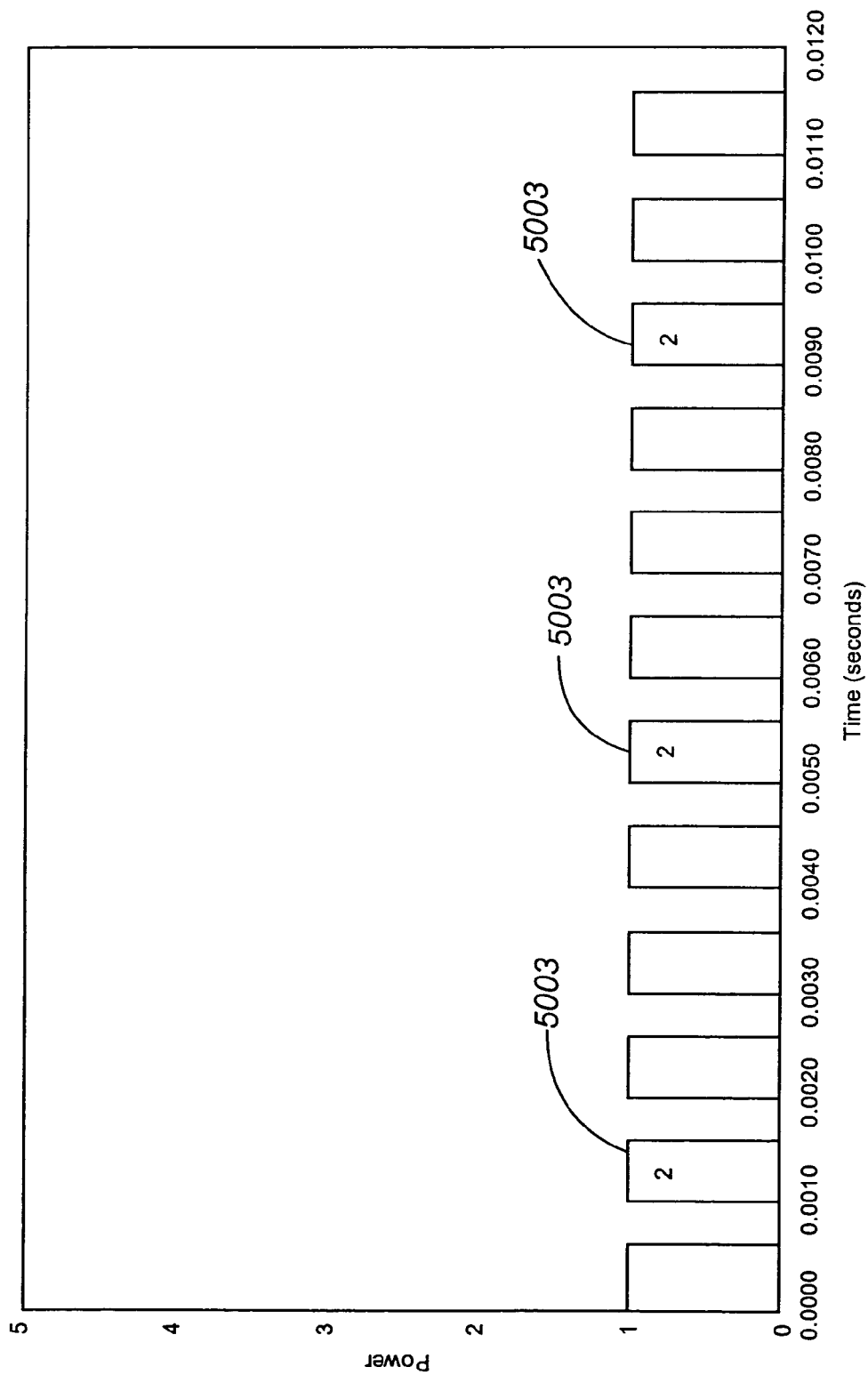

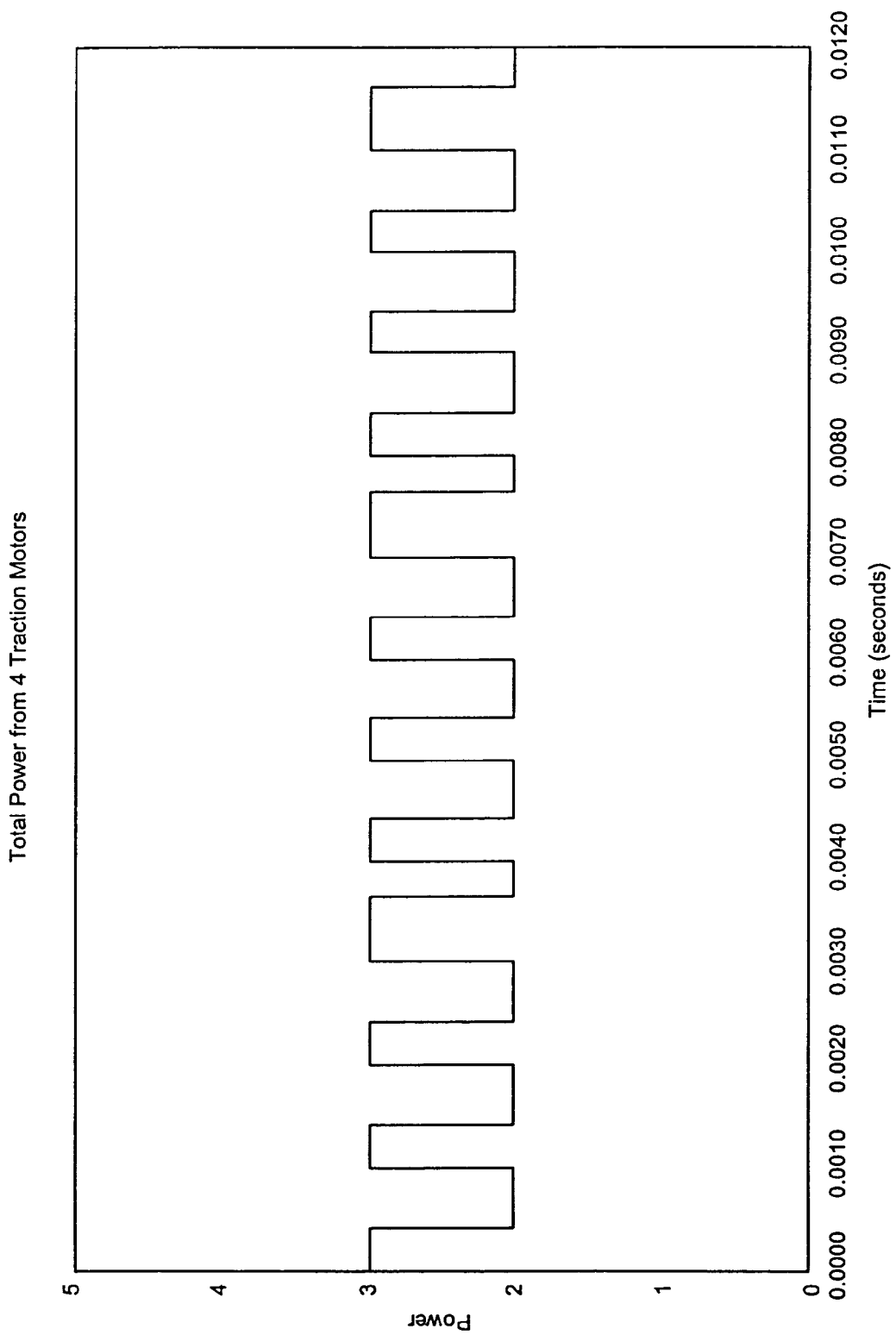

PREDICTING WHEEL SLIP AND SKID IN A LOCOMOTIVE

CROSS REFERENCE TO RELATED APPLICATION

The present application claims the benefits, under 35 U.S.C. §119(e), of U.S. Provisional Application Ser. No. 60/545,673, filed Feb. 17, 2004, of the same title, which is incorporated herein by this reference.

Cross reference is made to U.S. Pat. No. 6,812,656 issued Nov. 2, 2004 entitled "SEQUENCED PULSE WIDTH MODULATION METHOD AND APPARATUS FOR CONTROLLING AND POWERING A PLURALITY OF DIRECT CURRENT MOTORS", U.S. patent application Ser. No. 10/649,286, filed Aug. 26, 2003, entitled "METHOD FOR MONITORING AND CONTROLLING TRACTION MOTORS IN LOCOMOTIVES", and Ser. No. 10/650,011, filed Aug. 26, 2003, entitled "METHOD FOR MONITORING AND CONTROLLING LOCOMOTIVES", each of which is incorporated herein by this reference.

FIELD

The present invention relates generally to diesel-electric locomotives and specifically to wheel slip and skid management for a locomotive employing multiple independently controllable traction motors.

BACKGROUND

Existing railroad locomotives are typically powered by a diesel engine which utilizes an alternator to deliver electric power to traction motors which in turn power the drive wheels of the locomotive. The power to the traction motors is typically provided by a single chopper for DC traction motors or a single inverter for AC traction motors. One of the present inventors has disclosed a method and apparatus for controlling power provided to DC traction motors by furnishing an individual chopper circuit for each traction motor in U.S. Pat. No. 6,812,656 which is incorporated herein by reference. In this invention, independently controllable pulse width modulated power pulses are sequentially sent each motor. This patent discloses the practice of power reduction to individual motors to eliminate non-synchronous wheel slip.

As described in U.S. Pat. No. 6,208,097, when a locomotive accelerates, the traction motors apply torque to the driving axles which is converted to tractive effort of the wheels on the rails. When braking, an air brake system and often the motors themselves, may be used to apply a braking force on the rails. Maximum tractive or braking effort is achieved if each of the driving axles is rotating such that its actual tangential speed is slightly higher while accelerating or slightly lower when braking than the true ground speed of the locomotive. If adhesion is reduced or lost, some or all of the driving wheels may experience slip while accelerating or skid while braking. Wheel slip or wheel skid can lead to accelerated wheel wear, rail damage, high mechanical stresses in the drive components of the propulsion system, and an undesirable decrease of the desire tractive or braking effort.

Various methods of detection of wheel slip and wheel skid are known and are discussed, for example, in U.S. Pat. Nos. 5,610,819, 6,208,097 and 6,012,011. These methods include measurement of traction motor current, traction motor rpm and the use of tachometers on the driving axles.

As noted in U.S. Pat. No. 6,012,011, when wheel-slip occurs, the traction motors continue to develop torque further exacerbating the slip and the wheel speed must be reduced to correct this runaway condition. Typically, once wheel slip is detected, power is reduced to all the wheels, regardless of how many of the driving wheels are actually experiencing slip. Several techniques have been used in an attempt to control wheel-slip on railroad locomotives such as:

reducing the power output to all driving wheels when wheel-slip is detected on any axle until the wheel-slip stops applying an abrader material to the rails, such as sand, to increase adhesion.

application of friction brakes on the wheels that are slipping to slow the wheels.

when several locomotives are located at the front of a train and wheel-slip is detected on the leading locomotive, it can be stopped by reducing the power of only this locomotive.

While there is substantial prior art on detection of wheel slip conditions on individual wheels or axles, there is little prior art on means of controlling wheel slip by controlling individual wheels or axles. Johnson, in U.S. Pat. No. 6,012,011, discloses a traction control system for detecting and remedying wheel-slippage on individual wheels or axles. His system monitors the speed of each of the traction motors used to drive the wheels of a locomotive. If the speed of a particular traction motor indicates that the wheels are slipping, power is totally removed from that particular traction motor. While this method is an improvement in the art, independently turning traction motors on or off, even for brief periods, can still result in significant problems. For example, the power removed from a particular traction motor may be redistributed to the other motors until the diesel engine/electric generator prime power source is able to adjust to the new load. This power added to the other traction motors can, in turn, lead to wheel slippage on these other drive wheels, especially if they, as is often the case, are themselves near the threshold of slippage. Further, an abrupt change in power to a traction motor can have the same negative effects as an abrupt change in power to all the motors and may include accelerated wheel wear, rail damage, high mechanical stresses in the drive components of the propulsion system, and an undesirable decrease of tractive (or braking) effort.

Thus, there remains a need for a more precise control of individual traction motor power for better management of synchronous and non-synchronous wheel slip and wheel skid. A more precise control of individual traction motor power particularly during non-synchronous wheel slip and wheel skid can lead to strategies for better predicting and preempting wheel slip and skid and for modifying adhesion characteristics of the rails to inhibit the onset of conditions that lead to wheel slip and skid.

SUMMARY

These and other needs are addressed by the various embodiments and configurations of the present invention which is directed generally to methods and systems for terminating wheel slip and skid, predicting the onset of wheel slip and skid, and creating and using wheel slip and wheel skid data to inhibit or preempt the onset of wheel slip and skid.

In a first embodiment, the present invention is directed to a method for terminating wheel slip including the steps of: (a) determining that one or more wheels in a wheel set corresponding to a first traction motor of a plurality of traction motors is experiencing wheel slip; and (b) in response, incrementally reducing power to the first traction motor for a selected period of time while continuing to provide power in excess of the reduced power to at least one other traction motor. The reduced power level is nonzero and continues to drive, with reduced torque, the wheel set experiencing wheel slip.

In a second embodiment, a method is provided for terminating wheel skid including the steps of: (a) determining that one or more wheels in a wheel set corresponding to a first traction motor of a plurality of traction motors is experiencing wheel skid; and (b) in response, incrementally increasing power to the first traction motor for a selected period of time without increasing the power level, which may be zero during braking, applied to the other traction motors.

In the above embodiments, wheel slip and skid may be determined by any number of techniques. For example, the occurrence of wheel slip may be determined by (i) detecting an abrupt decrease in the traction motor current, (ii) detecting an abrupt change in the traction motor current derivative, (iii) detecting an abrupt increase in the revolutions-per-minute (rpms) of the traction motor or axle; (iv) detecting a characteristic "wheel slip" frequency response signature in the frequency spectrum of the current in the traction motor, and/or (v) determining when the wheel speed is greater than the true ground speed of the locomotive. The occurrence of wheel skid may be determined, for example, by (i) detecting an abrupt decrease to zero of the armature voltage of an individual traction motor, (ii) detecting an abrupt decrease to zero in the revolutions-per-minute (rpms) of an individual an individual traction motor, (iii) detecting an abrupt decrease to zero in the revolutions-per-minute (rpms) of an individual wheel or axle, (iv) detecting an abrupt increase in traction motor current or current derivative, (v) detecting the disappearance of commutator noise in the traction motor current, and/or (vi) determining when a wheel speed has stopped relative to the true ground speed of the locomotive.

In a third embodiment, a method is provided for inhibiting the onset of wheel slip and/or skid in an accelerating locomotive. For inhibiting the onset of wheel slip, the method includes the steps of: (a) receiving a requested notch setting, the requested notch setting providing more power to a plurality of traction motors than a current notch setting; (b) in response to the receiving step (a), determining whether wheel slip is likely for one or more wheels in a wheel set if the notch setting is implemented; and (c) when wheel slip is likely to occur, either: (i) implementing the requested notch setting but adjusting a power level associated with the requested notch setting for individual motors to inhibit the onset of wheel slip; or (ii) ignoring the requested notch setting and maintaining the current notch setting. For inhibiting the onset of wheel skid, the method includes the steps of: (a) braking at least one wheel set; (b) in response to the braking step (a), determining that wheel skid is likely for one or more wheels in a wheel set; and (c) when wheel skid is likely to occur, implementing an action to preempt the onset of wheel skid. Preemptive actions include applying less air pressure to the braking system and/or operating some or all of the traction motors at a positive power level to independently feather control of the braking force to individual wheels.

In a fourth embodiment, a lookup table of adhesion coefficients and associated locomotive/track/environmental conditions is used to predict the onset of wheel slip and/or skid. Adhesion coefficients can be determined wheel set-by-wheel set for each of wheel slip and skid. Wheel slip may be deliberately induced in a wheel set and used to generate an adhesion coefficient. In an illustrative example for wheel slip, when wheel slip occurs, an adhesion coefficient in effect at a selected point before and/or during the occurrence of wheel slip is determined. Power pulse widths and/or amplitudes to a selected traction motor can be incrementally increased until wheel slip occurs. An adhesion coefficient associated with wheel skid can be determined by monitoring, for example, the armature voltage, current or rpms of an individual traction motor or the rpms of an individual wheel or axle. The wheel skid lookup table can be used by a controller to predict the onset of wheel skid using a variable such as a pressure in the air bake system. Wheel skid may also be deliberately induced in a wheel set and maintained for a time sufficient to determine an adhesion coefficient. Deliberately inducing wheel slip/skid to generate additional entries to the adhesion coefficient table can be done traction motor-by-traction motor for differing locomotive/rail/environmental conditions. In this manner, the different properties of each traction motor/wheel set and the resulting different adhesion coefficients can be taken into account. For added insurance against wheel slip/skid, each of the adhesion coefficients can be appropriately adjusted by a safety factor so that the power level/braking force are well below that required to cause wheel slip/skid.

In another embodiment, wheel slip is deliberately induced in a wheel set, which is generally the front wheel set, and maintained for a time sufficient to condition a rail section over which the locomotive passes.

In one configuration, the method is applied to a locomotive where different traction motors drive wheel sets having different sets of adhesion factors. Differing sets of adhesion coefficients for individual wheel sets may arise from differences in traction motors, drive train and wheel variances and weight shifting amongst truck assemblies known to occur during acceleration. For each of the traction motors, a power level may be adjusted around the nominal power setting for each requested notch setting to inhibit the onset of wheel slip in the corresponding wheel set. The same is true for braking force to inhibit the onset of wheel skid.

In a further configuration, a controller predicts the onset of wheel slip using a variable, such as a torque, a tractive effort, a traction motor current and/or a traction motor speed associated with the requested notch setting. The variable is compared with a predetermined variable of the same type at and/or above which wheel slip is likely to occur. The predetermined variable is typically derived from an operational wheel slip history. If conditions for wheel slip are predicted, then preemptive action may be taken. Such preemptive actions include some or all of operating at reduced power, applying rail sanders or progressively reducing power in small increments beginning with the leading wheel set.

The use of individual power control circuits for each drive axle affords a straightforward means of smoothly removing and then restoring power to a selected drive axle. The flexibility of individually controlling power to the traction motors can be an efficient and effective approach to inhibiting and correcting non-synchronous wheel slip (during acceleration or motoring) or wheel skid (during braking) and by extension synchronous wheel slip and wheel skid; can be used to determine the adhesion coefficient of the rails; and can be used to effect some conditioning of the rails by causing one set of wheels to purposely slip. The various embodiments can avoid the operational problems associated with an immediate termination of power to the traction motor having a wheel set experiencing wheel slip. These operational problems include the immediate and concomitant redistribution of power to the other motors until the diesel engine/electric generator prime power source is able to adjust to the new load potentially leading to wheel slip on one or more other wheel sets, wheel wear, rail damage, high mechanical stresses in the drive components of the propulsion system, and an undesirable decrease of tractive (or braking) effort.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIGS. 5 through 10 show examples of sequencing power pulses to four individual motors where one of the motors is slightly increased and decreased in power.

FIGS. 7a, b and c show the power pulses to each traction motor where the power pulses are 45% of their maximum possible width.

DETAILED DESCRIPTION

Figure 1:
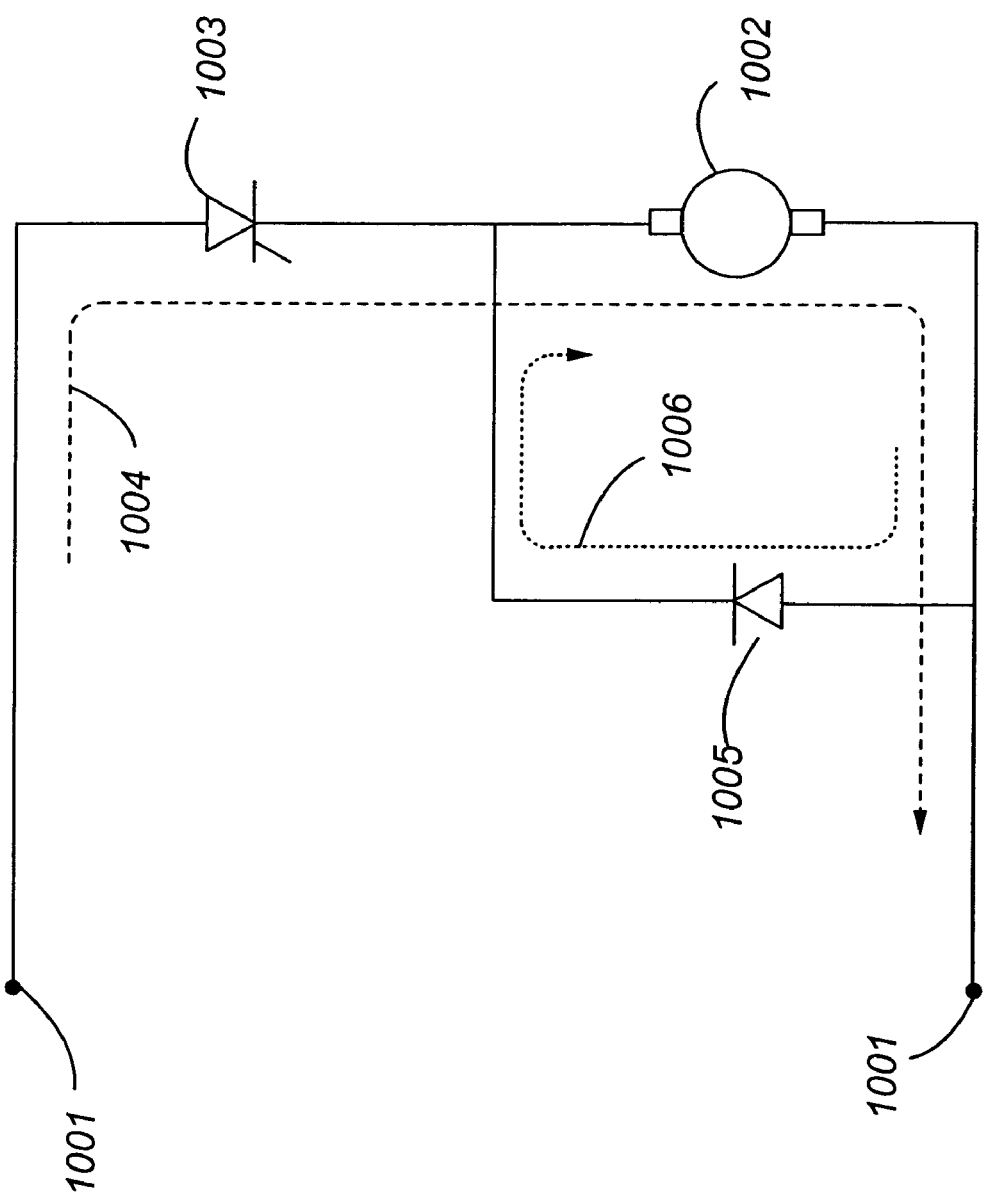
FIG. 1 shows a schematic of a prior art chopper circuit.

In the following description, the invention is illustrated primarily by reference to a locomotive with DC traction motors where a chopper circuit is associated with each DC traction motor. Each DC motor may be independently controlled by varying the pulse width or amplitude of the chopped power pulses. It is understood that the invention may also be applied to a locomotive with AC traction motors where an inverter circuit is associated with each AC traction motor. Each AC motor may be independently controlled by varying the output AC frequency or amplitude of the inverted power pulses.

All of the principal elements of the locomotive are monitored, coordinated and controlled by a controller such as, for example, a Programmable Logic Circuit ("PLC"), a micro-controller, or an industrial computer. The controller includes a detection scaling function which is logic for determining non-optimal performance, such as wheel slip. Power reduction to individual motors is put in place in the case of non-synchronous (also known as differential) wheel slip and overall power is reduced in the case of synchronous wheel slip.

The controller and a pulse width modulation module used in the present invention allow for pulse widths to individual motors to be controlled independently. The power pulses to individual traction motors are time sequenced by the controller which directs time-sequenced power pulses to individual chopper circuits and their corresponding DC traction motors. Power to each motor is increased by increasing pulse width while maintaining chopper frequency constant.

The ability to individually control the pulse width applied to each traction motor opens up the possibilities to tailor the power to each traction motor which in turn allows a number of wheel slip management techniques that cannot be implemented by previous traction motor power systems discussed in the body of prior art.

In normal operation, the pulse widths sent to each traction motor are the same for each motor. To increase power to the drive axles, the pulse widths are increased and, normally, all pulse widths are increased by the same amount. To decrease power to the drive axles, the pulse widths are decreased and, normally, all pulse widths are decreased by the same amount.

With the individual chopper circuits, if required, the width, and therefore the amount of power to an individual motor can be modified relative to those delivered to the other motors to increase or decrease power to the selected motor.

In a preferred embodiment, if the wheels on one or more of the drive axles is determined to be slipping during acceleration, then the power to the traction motor driving that axle experiencing wheel slip can be reduced in small, predetermined increments until the cessation of wheel slip is detected. This is an improvement over the art of U.S. Pat. No. 6,012,011 in which, when wheel slip is detected on an individual drive axle, the power is completely switched off until wheel slip is determined to have stopped.

In another embodiment of the invention, if the wheels on one or more of the drive axles are determined to be skidding during braking, then the power to the traction motor driving that axle experiencing wheel skid can be increased in small, predetermined increments until the cessation of wheel skid is detected. This improvement in braking control is not possible with the method disclosed in U.S. Pat. No. 6,012,011 in which the power to an individual drive axle can only be completely switched off. In a further aspect of this invention, a small level of positive power can be applied to the traction motors during braking to act as a means of detection of wheel skid or lock-up. The small amount of positive power will require a small amount of additional braking but will provide field current to the traction motor which can be used to detect wheel skid. Alternately, occurrence of wheel skid may be determined by (i) detecting an abrupt decrease to zero of the armature voltage of an individual traction motor (ii) detecting an abrupt decrease to zero in the revolutions-per-minute (rpms) of an individual wheel or axle, (iii) detecting the disappearance of commutator noise in the traction motor current history, (iv) detecting an abrupt increase in traction motor current or current derivative, and/or (v) determining when a wheel speed has stopped relative to the true ground speed of the locomotive.

In a more preferred embodiment, automatic actions are taken to preempt wheel slip by monitoring any two of the traction motor current history, derivative of the traction motor current history, motor torque, motor tractive effort, motor rpms and comparing these to a torque or tractive effort map of the motor stored in an on-board computer. The torque or tractive effort map is a compilation of the motor torque or tractive effort versus motor current or rpm for various rail contact friction or adhesion coefficients. Each motor may have a slightly different torque or tractive effort map as a result of differences in motor characteristics, weight on the axle and/or location of the drive axle on the locomotive. The computer also contains information on the torque or tractive effort map regions where the wheels may approach slip conditions. As the boundary to these regions is approached, the power to the motor connected to that axle is reduced incrementally until the axle torque or tractive effort is lowered to a predetermined distance on the torque or tractive effort map below the onset of wheel slip.

In another aspect of the preempting logic, the predetermined threshold locations of wheel slip may be automatically modified to a lower threshold if wheel slip is detected to be occurring too frequently. This can be accomplished by a mathematical or logical algorithm or by a self-learning logic such as embodied in a neural network computational process.

In yet another aspect of the preempting logic, if the adhesion coefficient is determined to be low or becoming low or if tractive effort is approaching the adhesion limit, then rail sanders can be activated automatically to increase adhesion or traction.

In another aspect of the invention, the ability to incrementally increase the power to a particular traction motor enables the ability to determine local rail adhesion conditions. By incrementally increasing power to a particular motor, it is possible to induce wheel slip and thereby determine the adhesion coefficient of the wheels on the rails. This information can be used, for example, to help determine the threshold for wheel slip for various locomotive, environmental and track conditions and therefore improve the preempting logic.

In yet another aspect of the invention, the ability to incrementally modify the power to a particular traction motor enables the ability to determine local rail adhesion conditions during braking. For example, the brakes may be applied and at the same time a modest amount of power can also be applied to all the traction motors. By incrementally decreasing power to a particular motor, it is possible to induce wheel skid momentarily and thereby determine the adhesion coefficient of the wheels on the rails. This information can be used, for example, to help determine the threshold for wheel skid for various locomotive, environmental and track conditions and therefore improve the preempting logic.

Further, the ability to incrementally modify the power from an individual motor relative to that delivered to other motors can be used to cause wheel slippage to help condition the rails for the remaining drive axles. For example, the leading drive wheels can be caused to slip and condition the rails, by removing moisture, ice or the like, for the subsequent or trailing drive wheel pairs.

The main elements of a prior art chopper circuit as used in the present invention, are shown in FIG. 1. The chopper circuit has input terminals 1001 through which current flows into the circuit. The main current flow is along path 1004 which passes through an Insulated Gate Bipolar Transistor (IGBT) switch 1003 and a traction motor 1002. The main current path 1004 is active when the input power source (not shown) is powering the traction motor 1002. When the IGBT 1003 is switched to its off position, current is forced to flow through the free-wheeling path 1006 by the free-wheeling gate 1005, which is shown as being a diode. The chopper circuit thus controls the speed of the motor by switching the input voltage on and off depending on what average output power is required; the longer the chopper is switched on, the higher the average output power. The time interval during which the chopper is switched on is known as the on-time; the interval during which the chopper is switched off is known as the off-time. The ratio of the on-time of the power pulse to the off-time of the power pulse is often referred to as the-mark-to-space ratio or chopper ratio.

In the present invention, there is preferably a chopper circuit associated with each traction motor. This is illustrated in the prior art FIG. 2 which is an electrical circuit schematic showing a DC power source, which may be a battery pack as shown here or a diesel engine with an alternator/rectifier or both, and four traction motors, each motor having an individual chopper circuit. This particular circuit configuration was disclosed in U.S. application Ser. No. 10/649,286. The power supply 2001 is connected to a traction motor system 2005 by disconnect switches 2003 which are controlled by a locomotive computer system. The power supply voltage is monitored by voltage sensor 2021 and the battery pack output current is measured by current sensor 2022.

Figure 2:
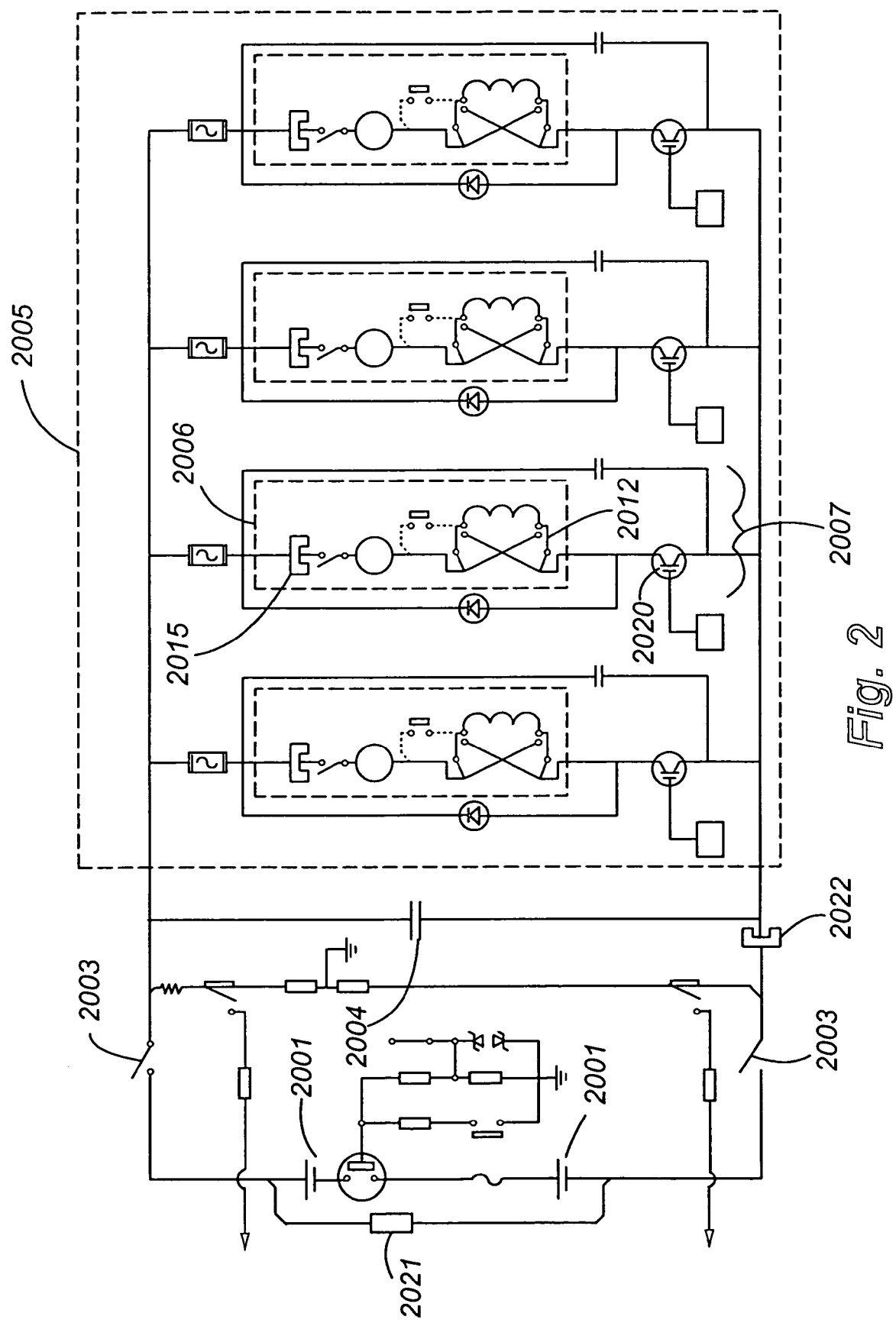
FIG. 2 shows an electrical schematic of a prior art battery-dominant hybrid locomotive with four DC traction motors.

The four traction motor systems 2005 are shown here connected in parallel with the power supply 2001. Each traction motor 2006 is associated with its own individual chopper circuit 2007. The IGBT 2020 is controlled by the locomotive computer system. The main current through each traction motor 2006 is monitored by a current transducer 2015. FIG. 2 also shows a configuration 2012 to effect the switching necessary to reverse the motor direction by reversing the current flow through the field coils.

Figure 3:
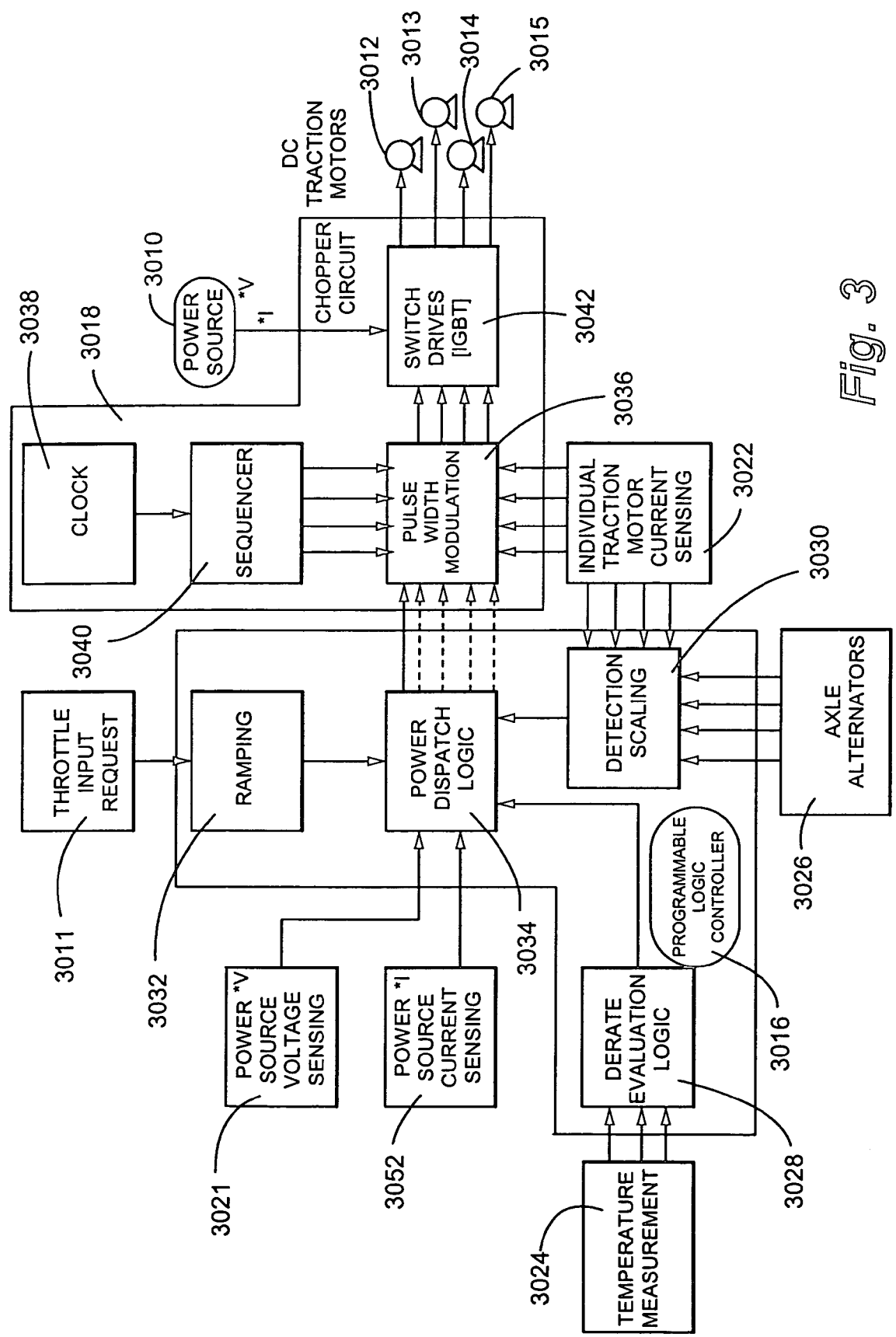
FIG. 3 is a block diagram illustrating a prior art electrical control system for individually controlling a plurality of direct current motors.
Figure 4A:
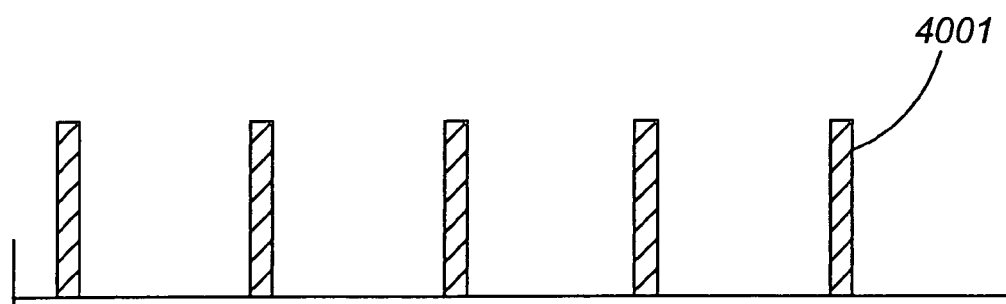
FIG. 4 shows a series of sequential but non-overlapping power control pulses used in the prior art where all pulses have the same power.
Figure 4B:
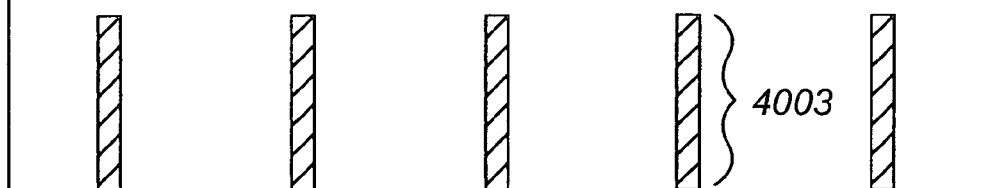
Figure 4C:
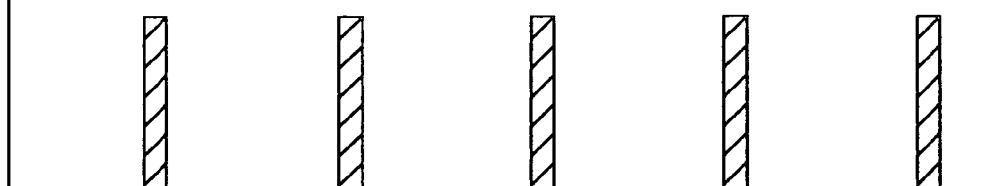
Figure 4D:
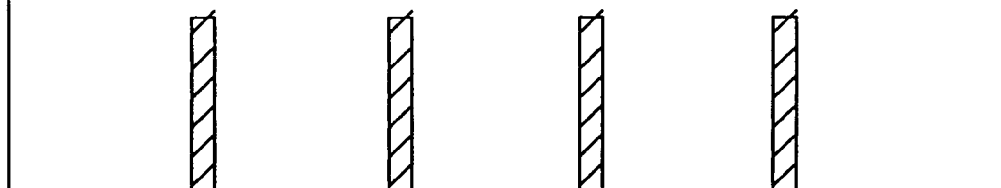
Figure 4E:
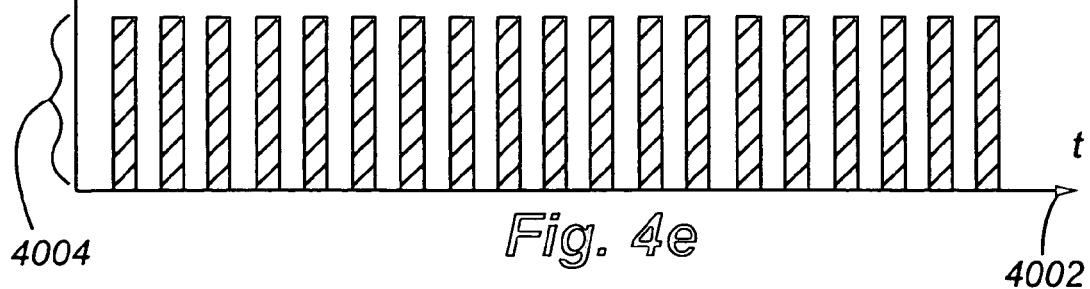

FIG. 3, which was first disclosed in U.S. application Ser. No. 10/083,587, illustrates the general control system for coordinating the throttle input requests with the distribution of power to the traction motors. A locomotive drive system comprises a DC power source 3010 such as a battery pack and a plurality (typically 4 or 6 in number) of DC motors 3012, 3013, 3014 and 3015. An input device 3011 provides throttle input information by means of which the operator selects the desired speed or power requirement. The operator also receives feedback information from the controller 3016.

A controller, such as for example a PLC 3016 receives the information from the input device 3011 and sends the information to the power control system (chopper circuit 3018 in the power control system), which subsequently individually controls a plurality of DC motors 3012.

The throttle input information is provided by an input device 3011 that the locomotive operator uses to request the amount of power to be applied to the rails via the motors 3012. This is typically a throttle notch between idle and eight positions but also could be an electronic device, such as an infinitely variable control or a touch screen.

A power source voltage sensing device 3021 is provided to measure the voltage of the power source 3010. A current sensing device 3052 is provided to measure the amount of current flowing from the power source 3010. Further individual motor current sensing devices 3022 enable the amount of current flowing to each DC motor 3012, 3013, 3014 and 3015 to be measured, allowing the information to be supplied to the controller 3016.

Axle alternators 3026 are electronic devices capable of measuring the revolutions of the axle on which they are installed. This information is sent to the controller 3016 to determine speed or detect situations that require attention and correction, such as wheel slip and wheel skid.

The controller 3016 is programmed according to usual methods to carry out the following functions. The controller processes throttle input requests, power source voltage, and determines current control points to satisfy individual traction motor power requirements. It also comprises a derate evaluation logic function 3028, which is logic to reduce the power demand below that requested by the operator for protection of equipment. This could include reducing power in case equipment is at risk of overheating or currents climb close to equipment design limits. It comprises a detection scaling function 3030, which is logic for determining non-optimal performance, such as wheel slip. Power reduction to individual motors is put in place in the case of differential wheel slip and overall power is reduced in the case of synchronous wheel slip. Power increase to individual motors is put in place in the case of differential wheel skid and overall power is increased in the case of synchronous wheel skid.

A ramping function 3032 is provided, which is logic to ramp requested throttle level at a rate that is reasonable for the locomotive. A power dispatch logic function 3034 is also provided, which is central logic that evaluates any pertinent derate conditions, any wheel slip, as well as the requested throttle level, to determine the appropriate power level to be sent to the pulse width modulation module 3036 as well as any individual power reductions that may be necessary.

The chopper circuit 3018 comprises the following elements. A clock 3038 comprises an integrated circuit that generates a series of pulses. A sequencer 3040 is an integrated circuit that sequences the pulses into uniform periods for purposes of the pulse width regions for each motor. A pulse width modulation module 3036 provides clipped triangular waveforms that result in the creation of a series of pulses, which is used essentially to toggle the power switch devices on and off according to the pulses. The drive switches 3042 are IGBTs that are switching devices that are capable of sequentially pulsing the power source to the different motors at a very fast rate.

In prior art applications, a single chopper circuit has been used to control the speed of all of the DC traction motors. This has a number of disadvantages. For example, if one of the wheels is slipping (non-synchronous wheel slip), the chopper reduces power to all of the motors which risks further exacerbation of the problem.

FIG. 4 shows a time sequence of short pulses 4001 to each motor typical of locomotive start up at a low throttle condition. This figure is prior art and was disclosed in U.S. patent application Ser. No. 10/083,587. The pulses 4001 in each sequence are shown along a time axis 4002 which is a common time axis for each sequence. Since the voltage amplitude of the pulses 4001 are shown here as approximately constant, the pulse amplitudes 4003 may be considered current or power amplitudes. Although not required, each motor receives a power pulse 4001 at a different time. FIG. 4a represents the pulses provided to a first traction motor; FIG. 4b to a second traction motor; FIG. 4c to a third traction motor; and FIG. 4d to a fourth traction motor. FIG. 4e shows the sum of the individual motor sequences 4004.

The method illustrated In FIG. 4 is implemented by commanding time-sequenced power pulses to individual chopper circuit/DC traction motor arrays. Power to each motor is increased by increasing pulse width while maintaining frequency constant. Power is drawn at different times for different motors by starting the power pulses to each motor at a constant offset from neighboring pulses. The offsets are the maximum possible. At low power settings, the power pulses to each motor are not overlapping. As the commanded power increases, the power pulses are widened so that eventually neighboring power pulses overlap.

It is noted that the voltage amplitude of all power pulses can be constant. Thus at low speed, the motor current pulses are maximum amplitude. As speed increases, the motor develops a back emf which reduces the amplitude of the current pulses. This is compensated for by increasing pulse width.

The logic controller allows for pulse widths to individual motors to be controlled independently. Normally, all pulse widths are increased or decreased by the same amounts. The ability to individually control the level of power applied to different axles results in an efficient and effective approach to correcting wheel slip for both non-synchronous as well as synchronous wheel slip.

The method illustrated in FIG. 4 can be summarized as follows. The level of power applied to different axles by applying pulse width modulation to a plurality of DC traction motors by time-sequencing the pulses to individual motors is carried out such that the time separation between pulses to different motors is always maximized. Note that the pulses referred to are the control pulses sent out by the PLC or microprocessor to the individual chopper circuits. The pulses seen by the DC motors are smoothed out by the capacitor filters across the motors.

Differentially Modifying Power to Individual Traction Motors

The advantages of individual chopper circuits with each traction motor are illustrated in FIGS. 5 through 10 which show examples of sequencing power pulses to four individual motors where one of the motors is slightly increased and decreased in power relative to the power level applied to the other three motors.

Figure 5A:
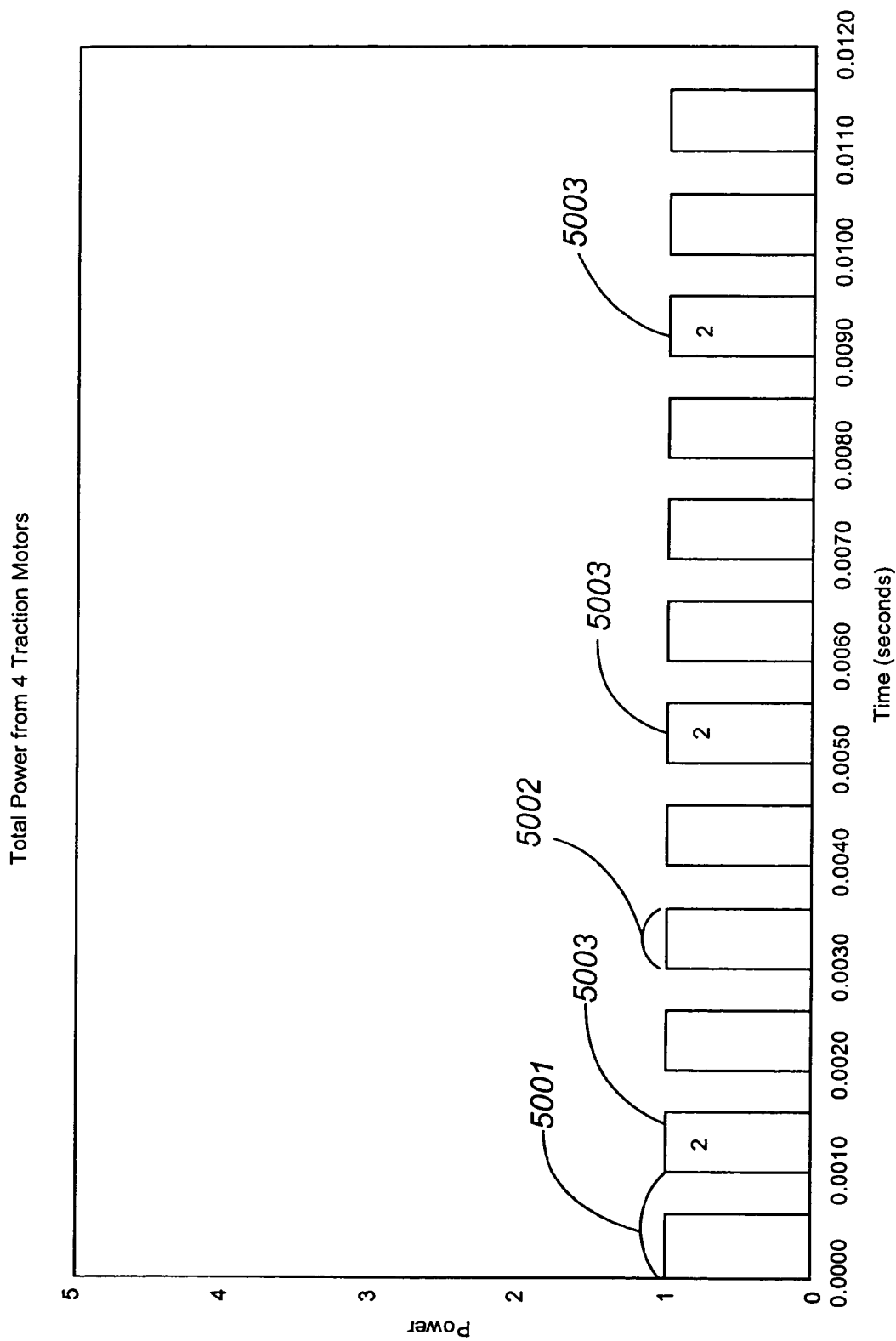
FIGS. 5a, b and c show the power pulses sent to four traction motors at a chopper frequency of 250 Hz where the power pulse to each traction motor is 15% of its maximum possible width.

FIG. 5a shows power pulses of equal widths sent to four traction motors at a chopper frequency of 250 Hz. The start time of each pulse is offset from the adjacent pulse by 1 millisecond 5001. In FIG. 5a the power pulse sent to each traction motor is 15% of its maximum possible width. Therefore each pulse is 0.6 milliseconds in width 5002. In this example, none of the pulses overlap. In FIG. 5b, the power to motor #2 5003 is reduced by 10% so the pulse width for motor #2 5003 is now 0.54 milliseconds in width while the other 3 motors have pulse widths of 0.6 milliseconds. In FIG. 5c, the power to motor #2 5003 is increased by 10% so the pulse width for motor #2 is now 0.66 milliseconds in width while the other 3 motors have pulse widths of 0.6 milliseconds.

Figure 6A:
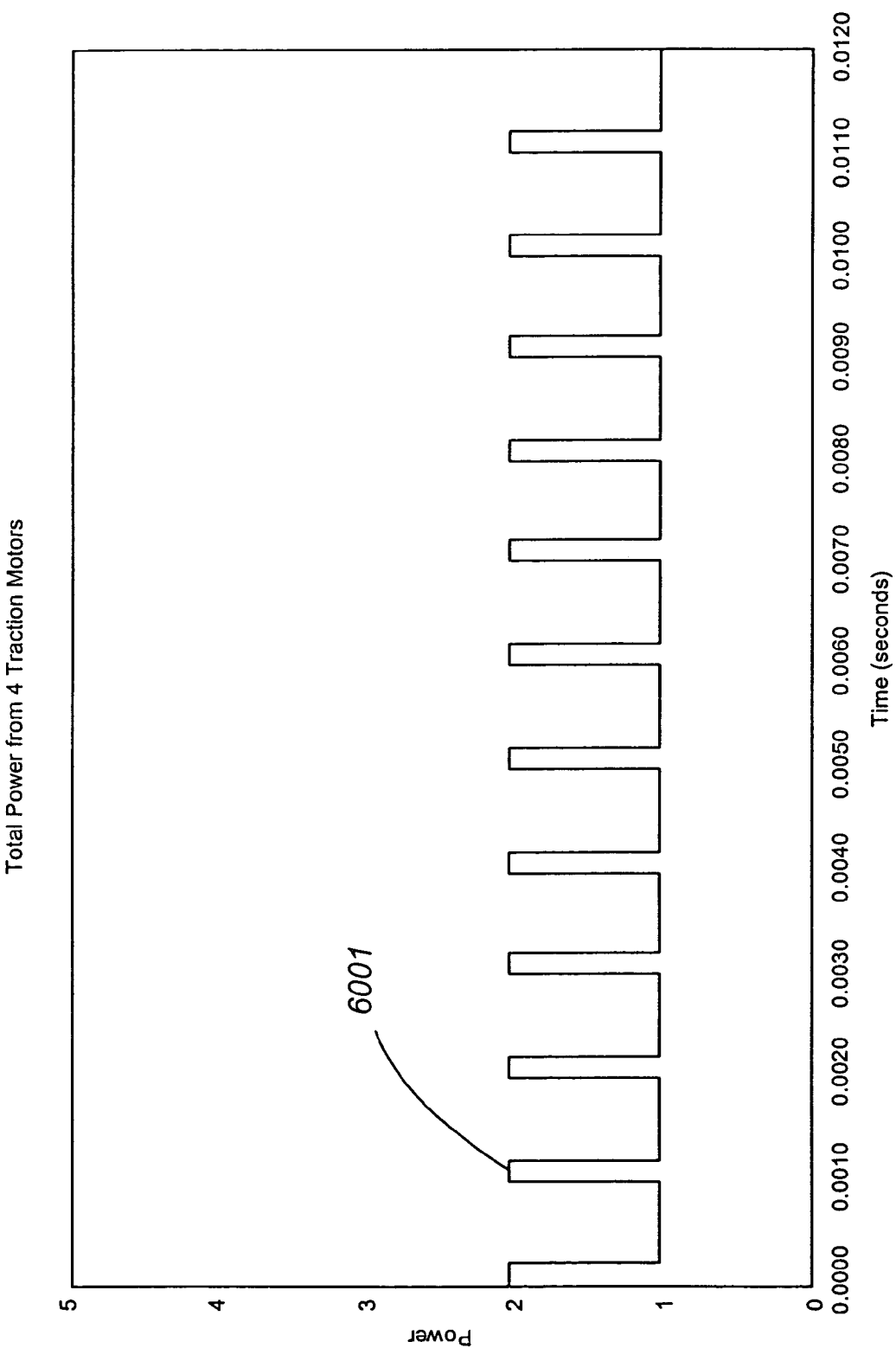
FIGS. 6a, b and c show the power pulses to each traction motor where the power pulses are 30% of their maximum possible width.
Figure 6B:
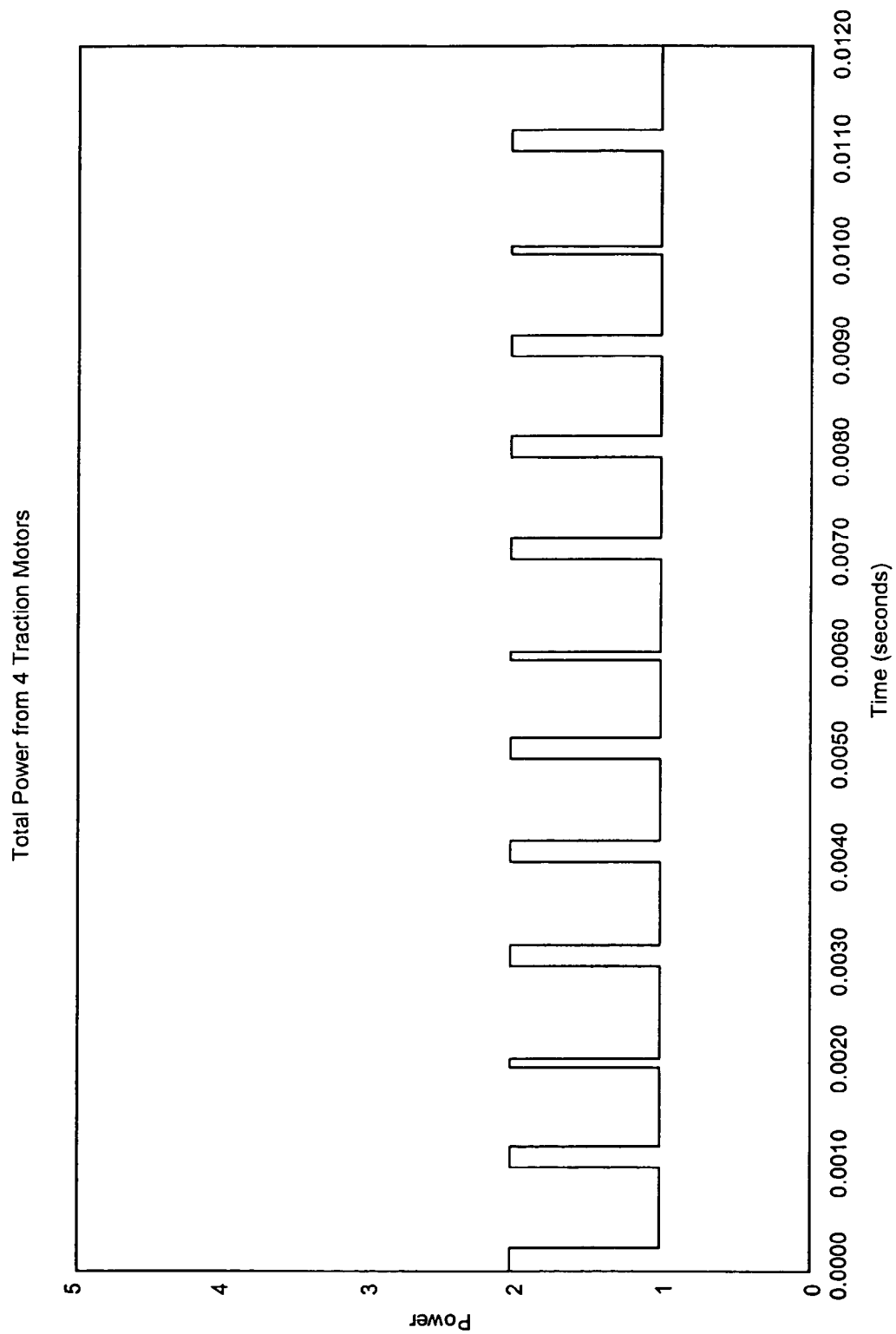
Figure 6C:
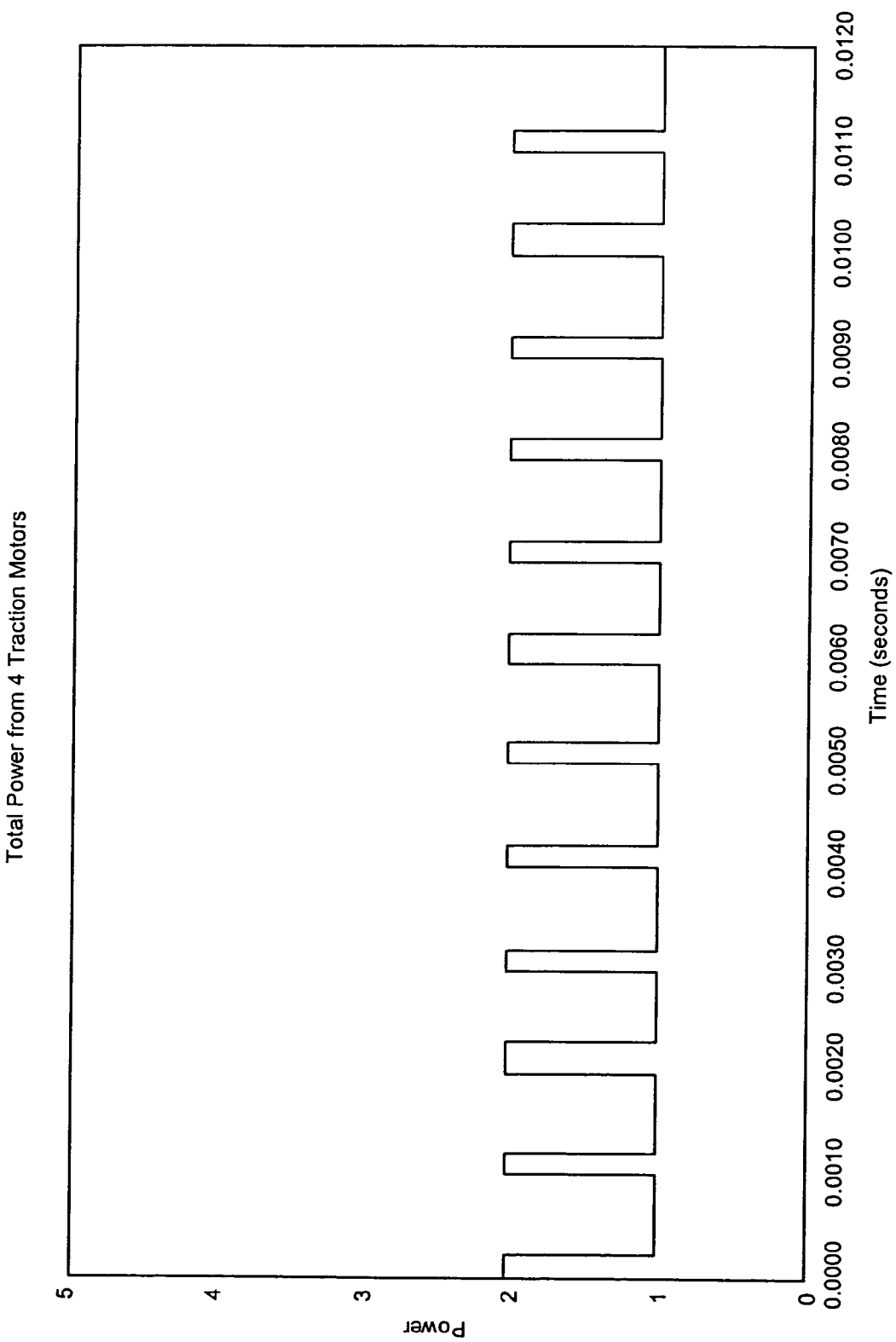

In FIG. 6a, the power pulse to each traction motor is 30% of its maximum possible width. Therefore each pulse is 1.2 milliseconds in width and the pulses partially overlap so that the total power to all 4 motors is additive for a small fraction of the time 6001. In FIG. 6b, the power to motor #2 is reduced by 10% so the pulse width for motor #2 is now 1.08 milliseconds in width while the other 3 motors have pulse widths of 1.2 milliseconds. In FIG. 6c, the power to motor #2 is increased by 10% so the pulse width for motor #2 is now 1.32 milliseconds in width while the other 3 motors have pulse widths of 1.2 milliseconds. The effect of reducing or increasing the power to one motor (motor #2) is clearly seen in FIGS. 6b and 6c.

Figure 7B:
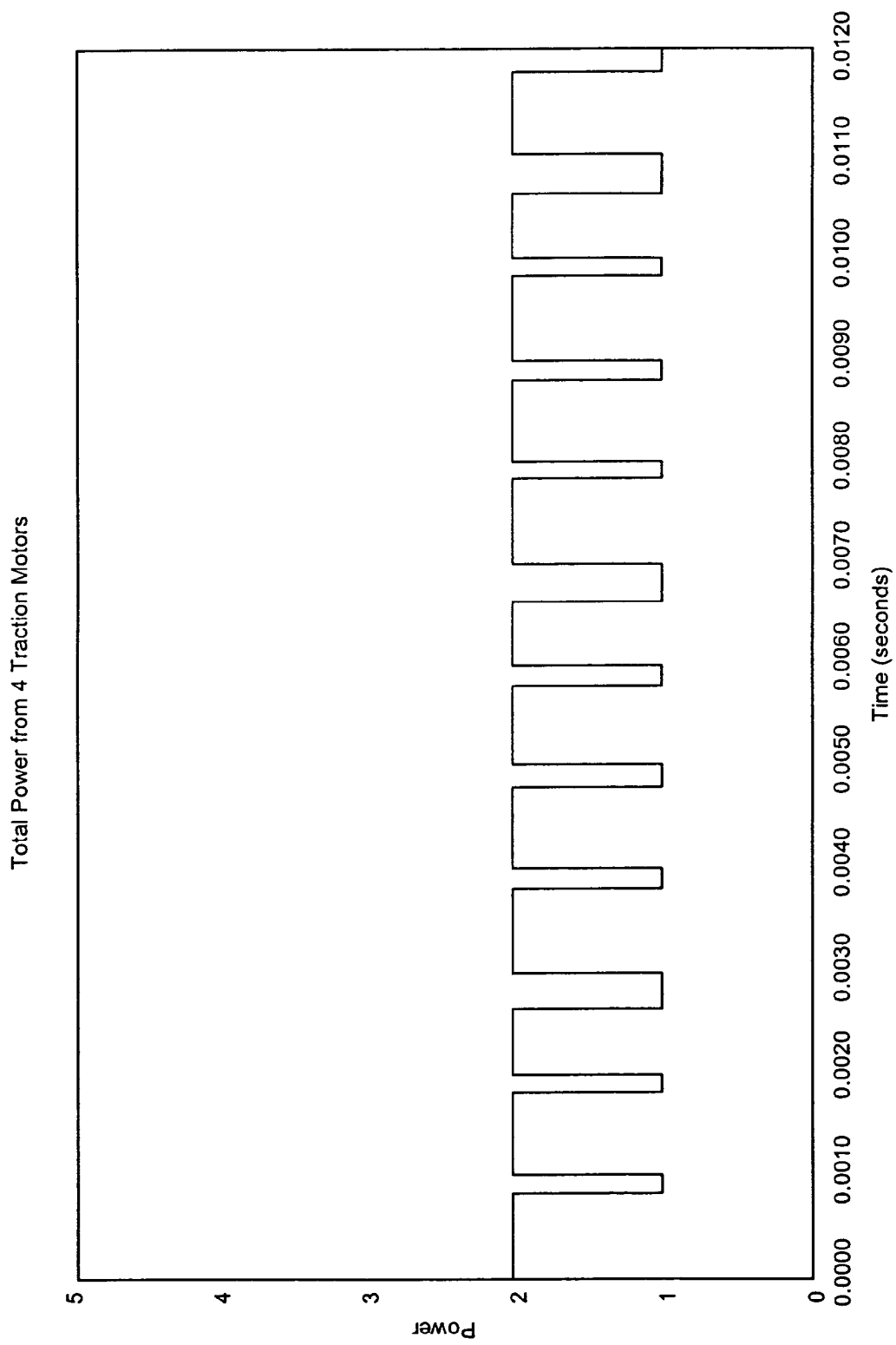
Figure 7C:
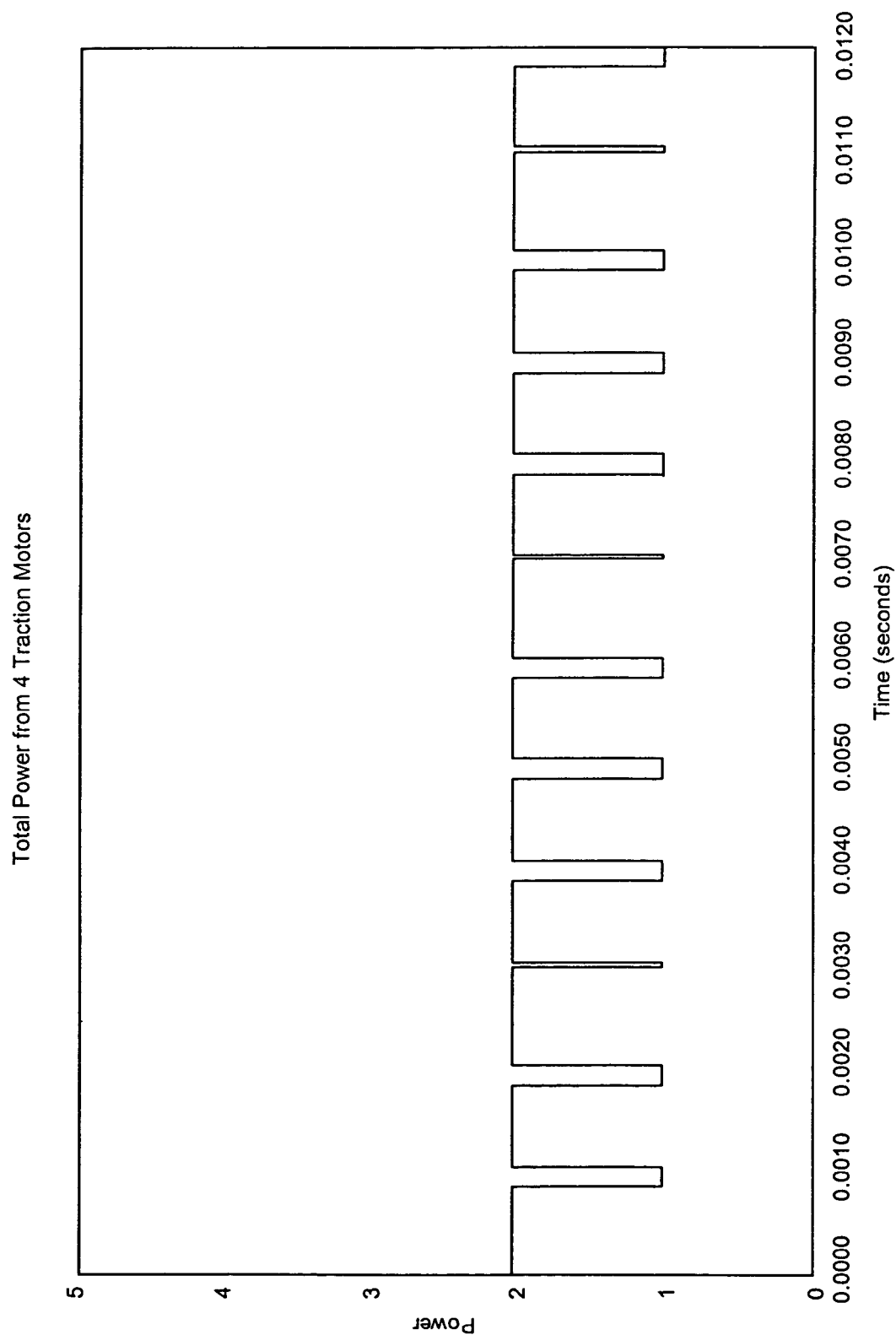

In FIG. 7a, the power pulse to each traction motor is 45% of its maximum possible width. Therefore each pulse is 1.8 milliseconds in width and the pulses overlap enough that the total power to all 4 motors is almost continuously twice the power output of one motor. In FIG. 7b, the power to motor #2 is reduced by 10% so the pulse width for motor #2 is now 1.62 milliseconds in width while the other 3 motors have pulse widths of 1.8 milliseconds. In FIG. 7c, the power to motor #2 is increased by 10% so the pulse width for motor #2 is now 1.98 milliseconds in width while the other 3 motors have pulse widths of 1.8 milliseconds.

Figure 8A:
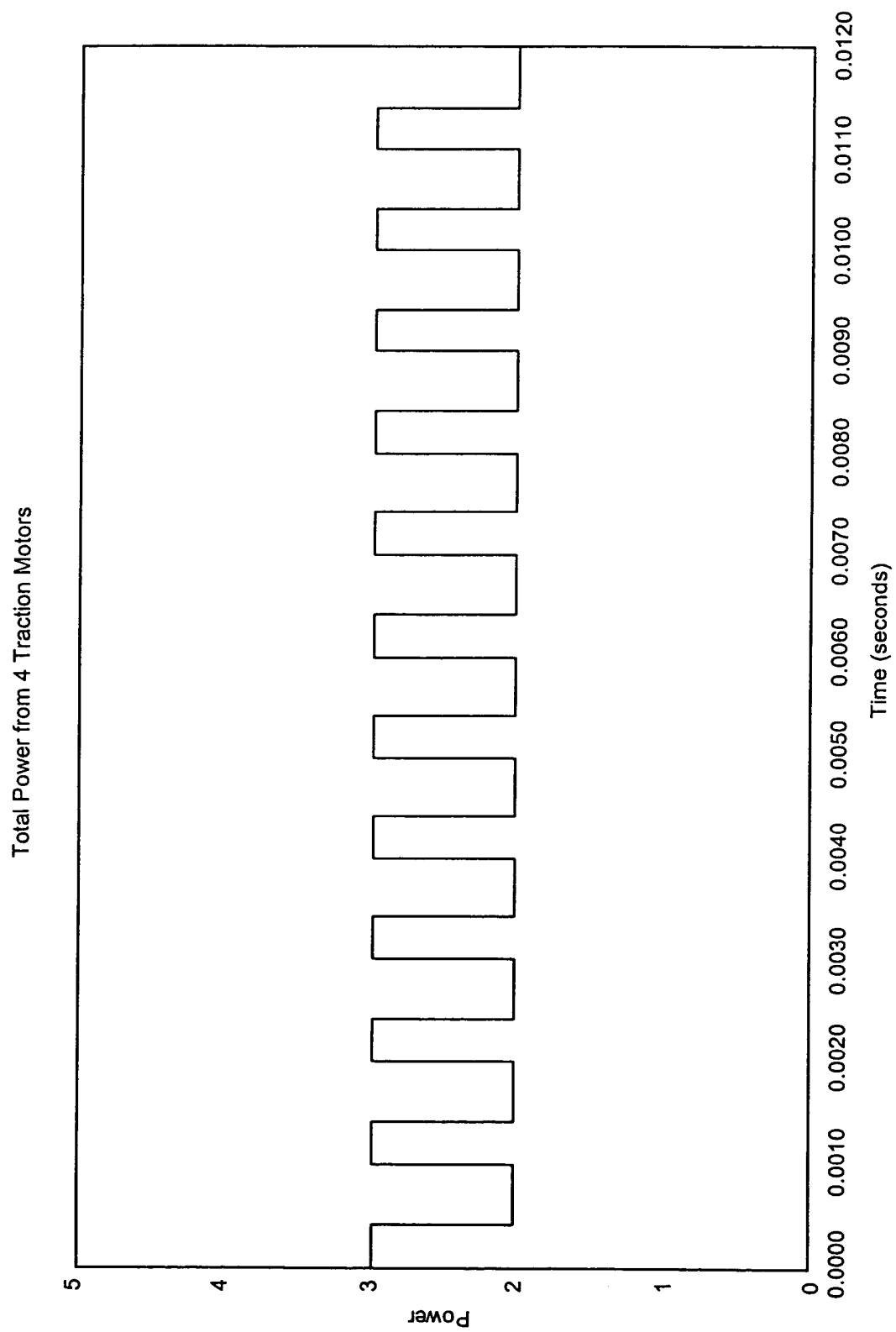
FIGS. 8a, b and c show the power pulses to each traction motor where the power pulses are 60% of their maximum possible width.
Figure 8B:
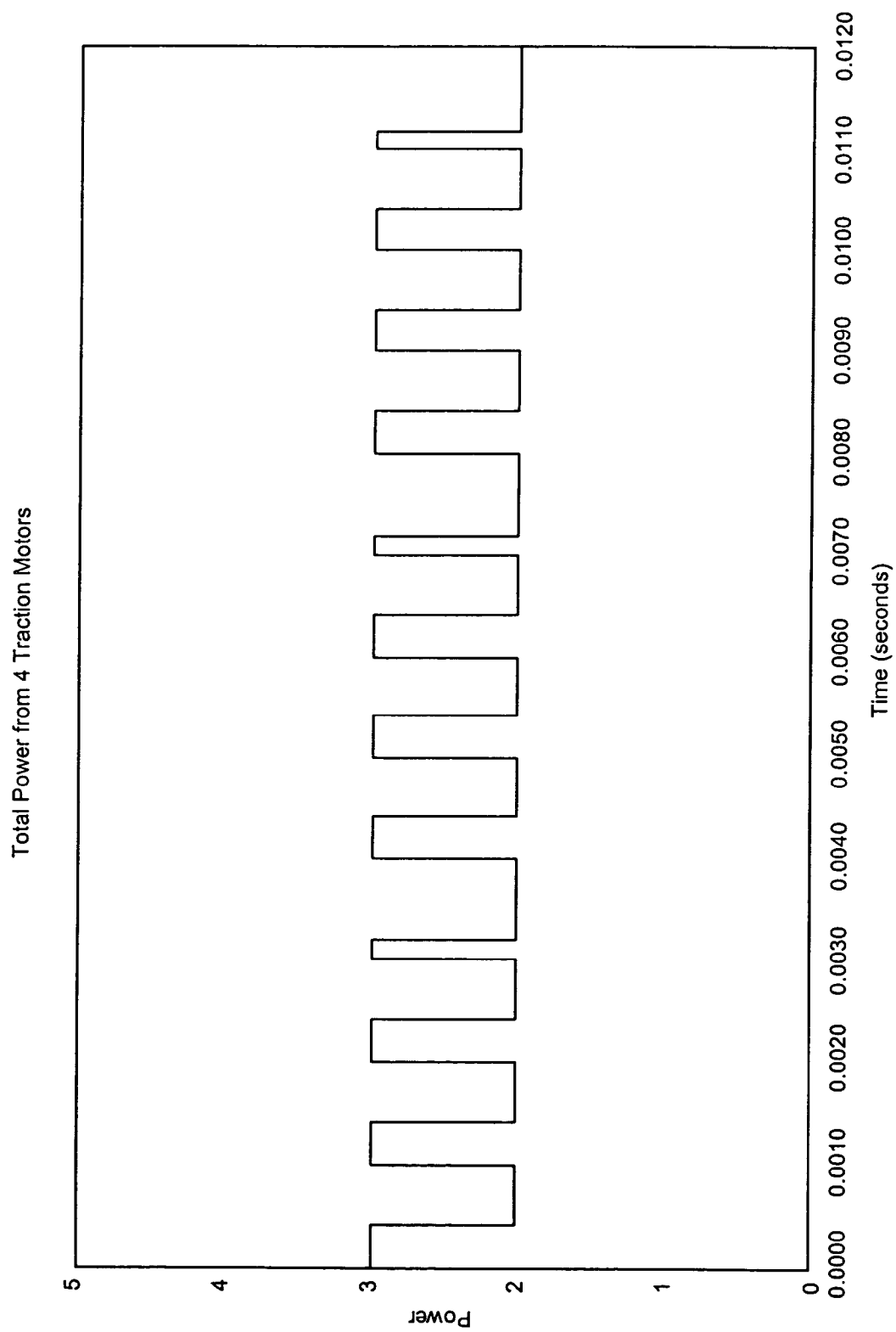

In FIG. 8a, the power pulse to each traction motor is increased to 60% of its maximum possible width. Therefore each pulse is 2.4 milliseconds in width and the pulses substantially overlap enough that the total power to all 4 motors is always greater than twice the power output of one motor and sometimes greater than three times the output of one motor. In FIG. 8b, the power to motor #2 is reduced by 10% so the pulse width for motor #2 is now 2.16 milliseconds in width while the other 3 motors have pulse widths of 2.4 milliseconds. In FIG. 8c, the power to motor #2 is increased by 10% so the pulse width for motor #2 is now 2.64 milliseconds in width while the other 3 motors have pulse widths of 2.4 milliseconds.

Figure 9A:
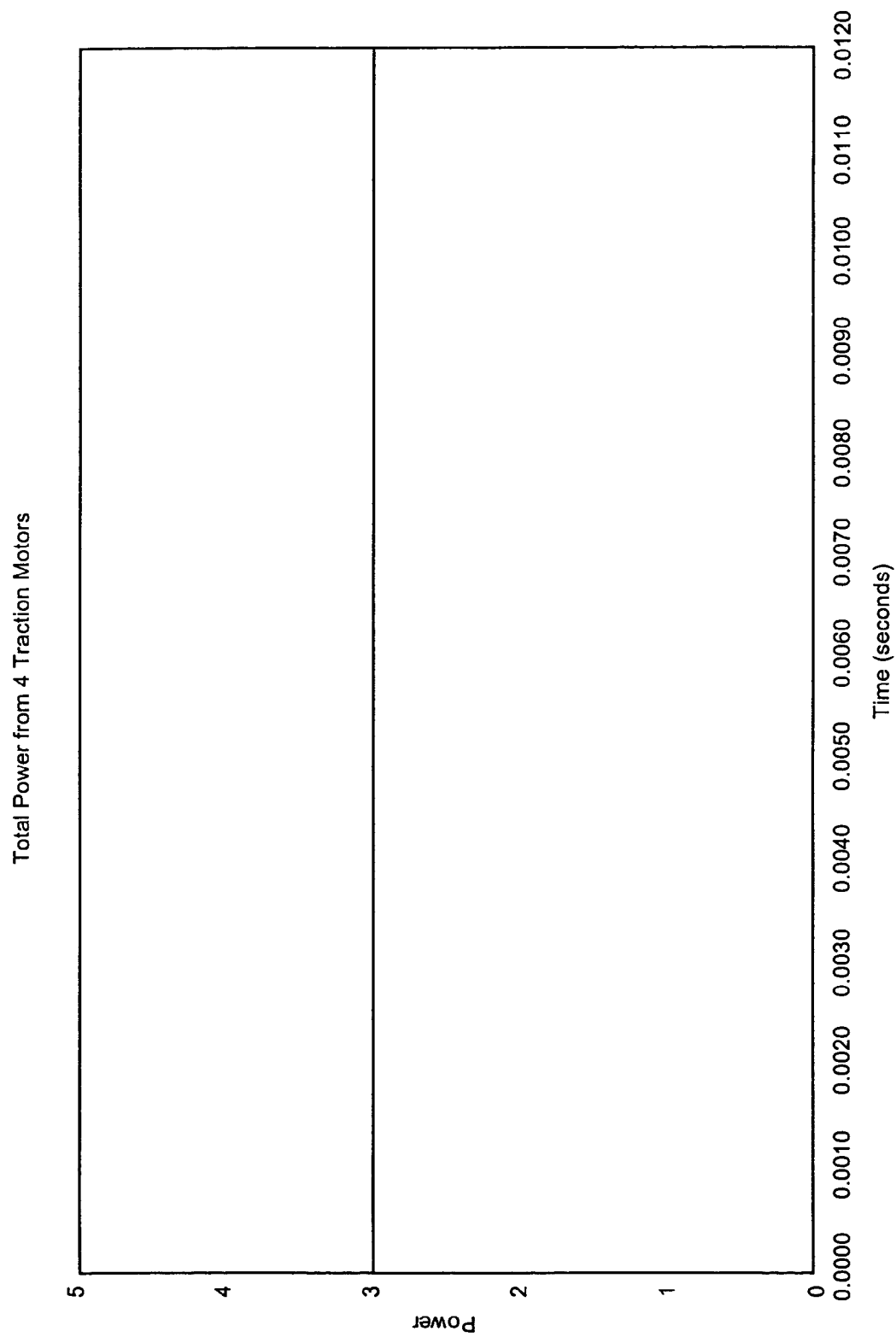
FIGS. 9a, b and c show the power pulses to each traction motor where the power pulses are 75% of their maximum possible width.
Figure 9B:
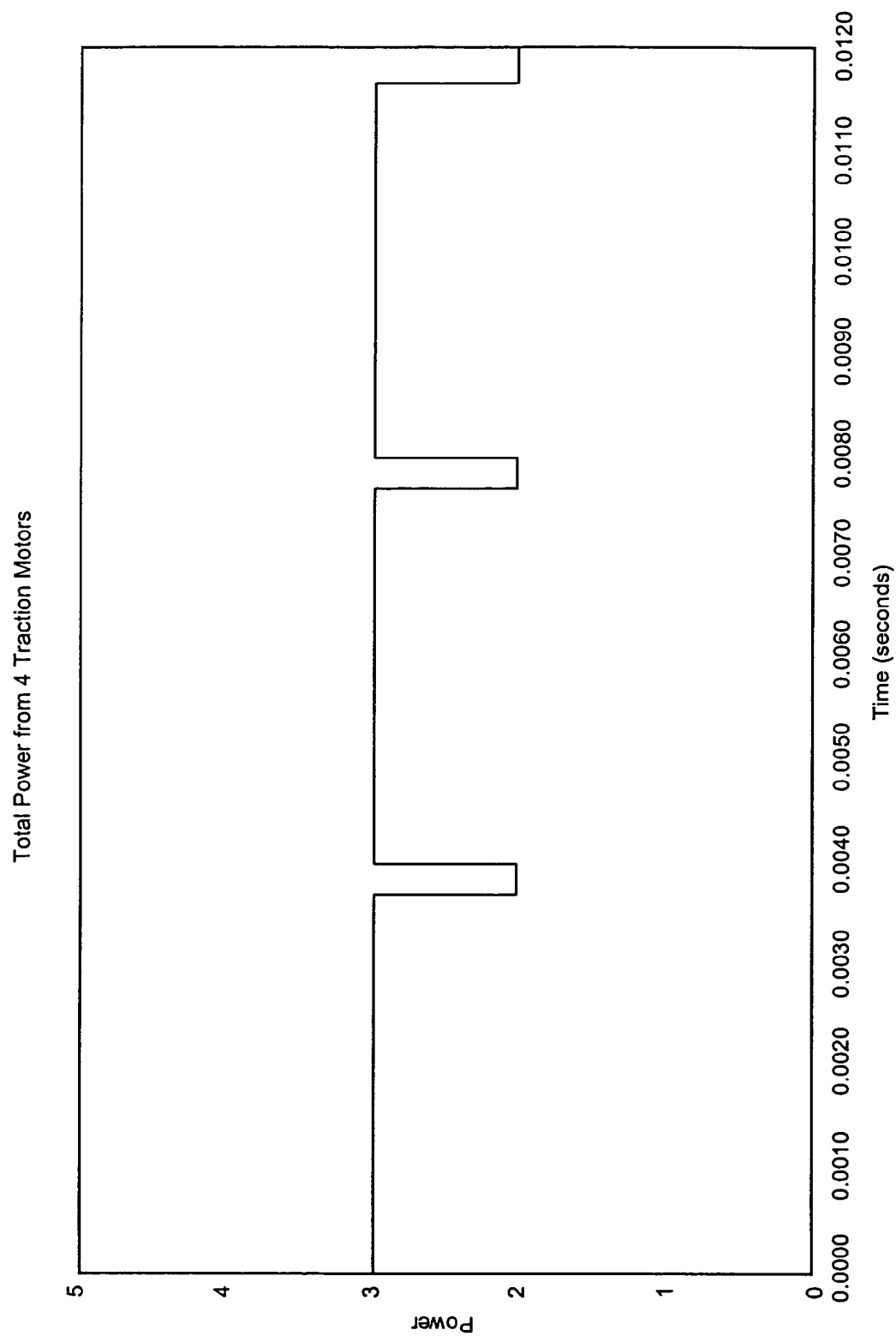
Figure 9C:
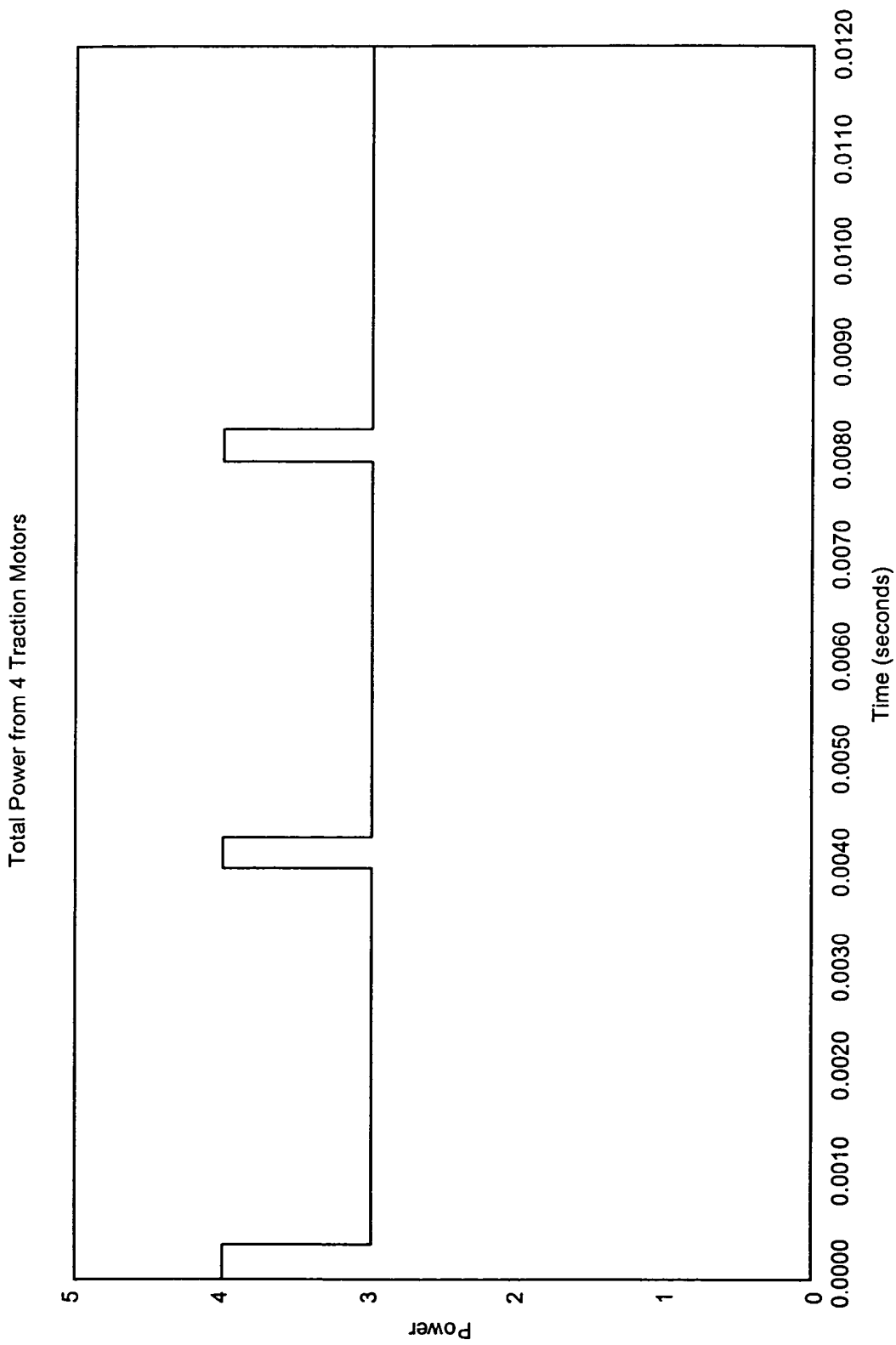

In FIG. 9a, the power pulse to each traction motor is increased to 75% of its maximum possible width. Therefore each pulse is 3.0 milliseconds in width and the pulses overlap enough that the total power to all 4 motors is always three times the power output of one motor. In FIG. 9b, the power to motor #2 is reduced by 10% so the pulse width for motor #2 is now 2.70 milliseconds in width while the other 3 motors have pulse widths of 3.0 milliseconds. In FIG. 9c, the power to motor #2 is increased by 10% so the pulse width for motor #2 is now 3.3 milliseconds in width while the other 3 motors have pulse widths of 3.0 milliseconds.

Figure 10A:
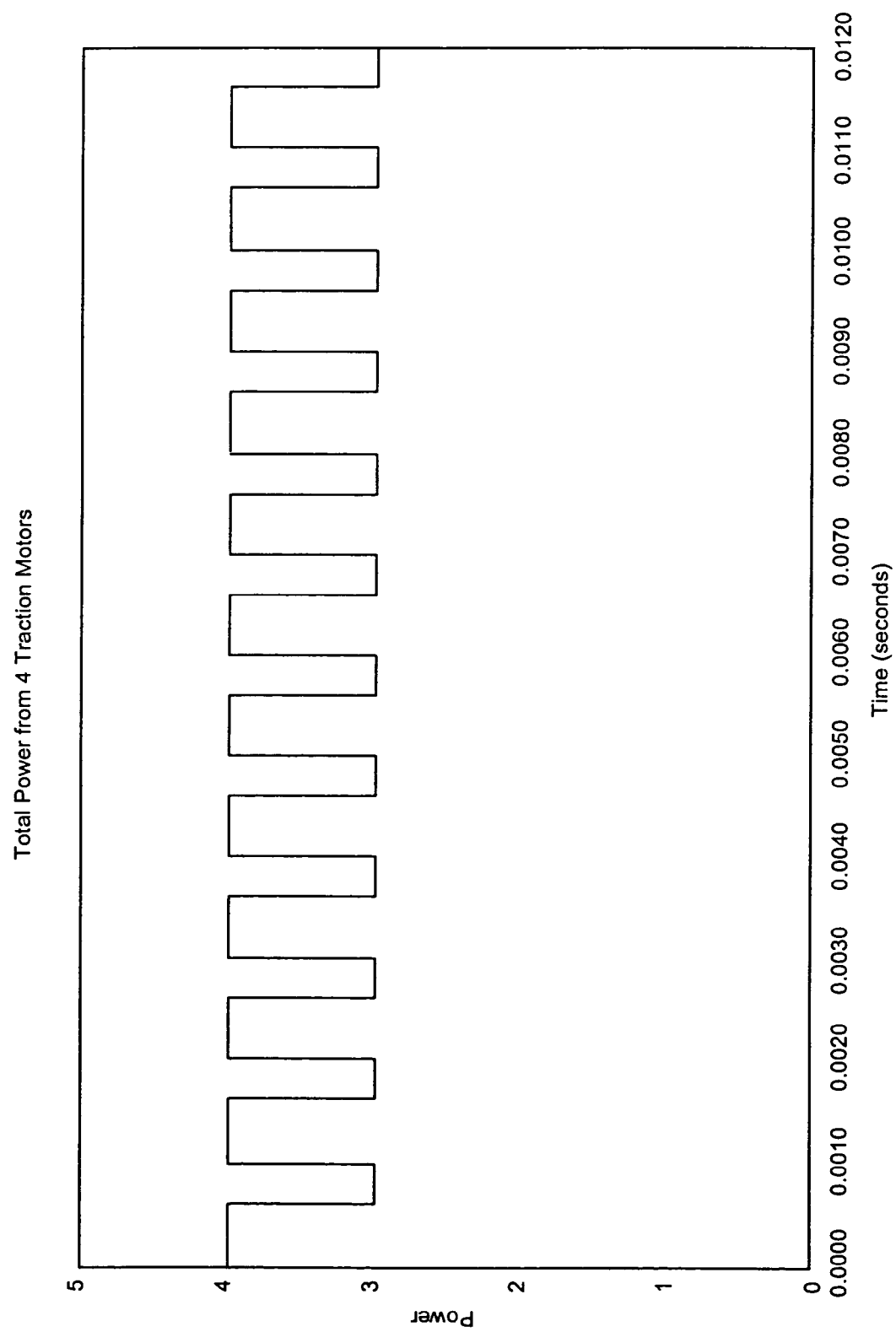
FIGS. 10a, b and c show the power pulses to each traction motor where the power pulses are 90% of their maximum possible width.
Figure 10B:
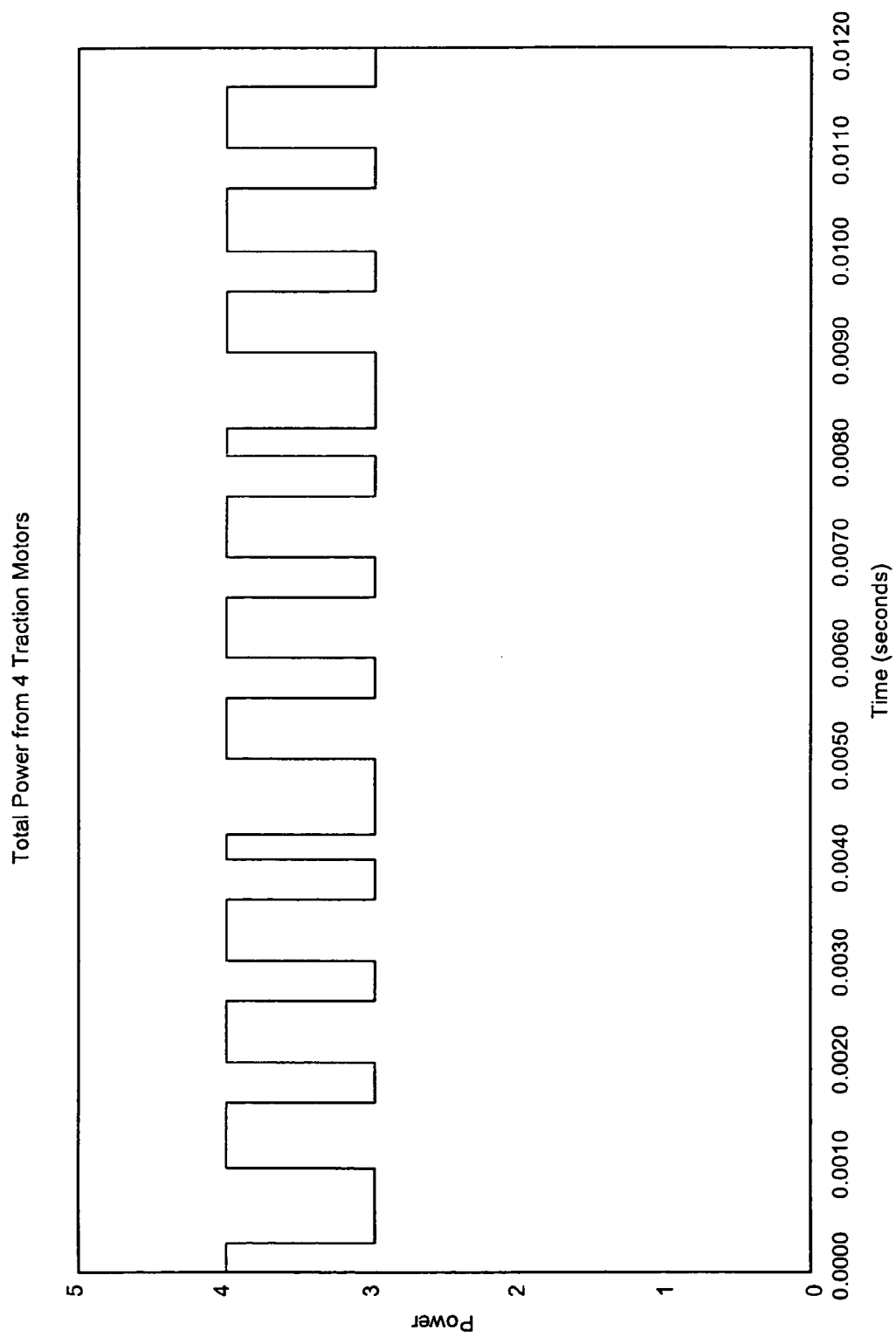
Figure 10C:
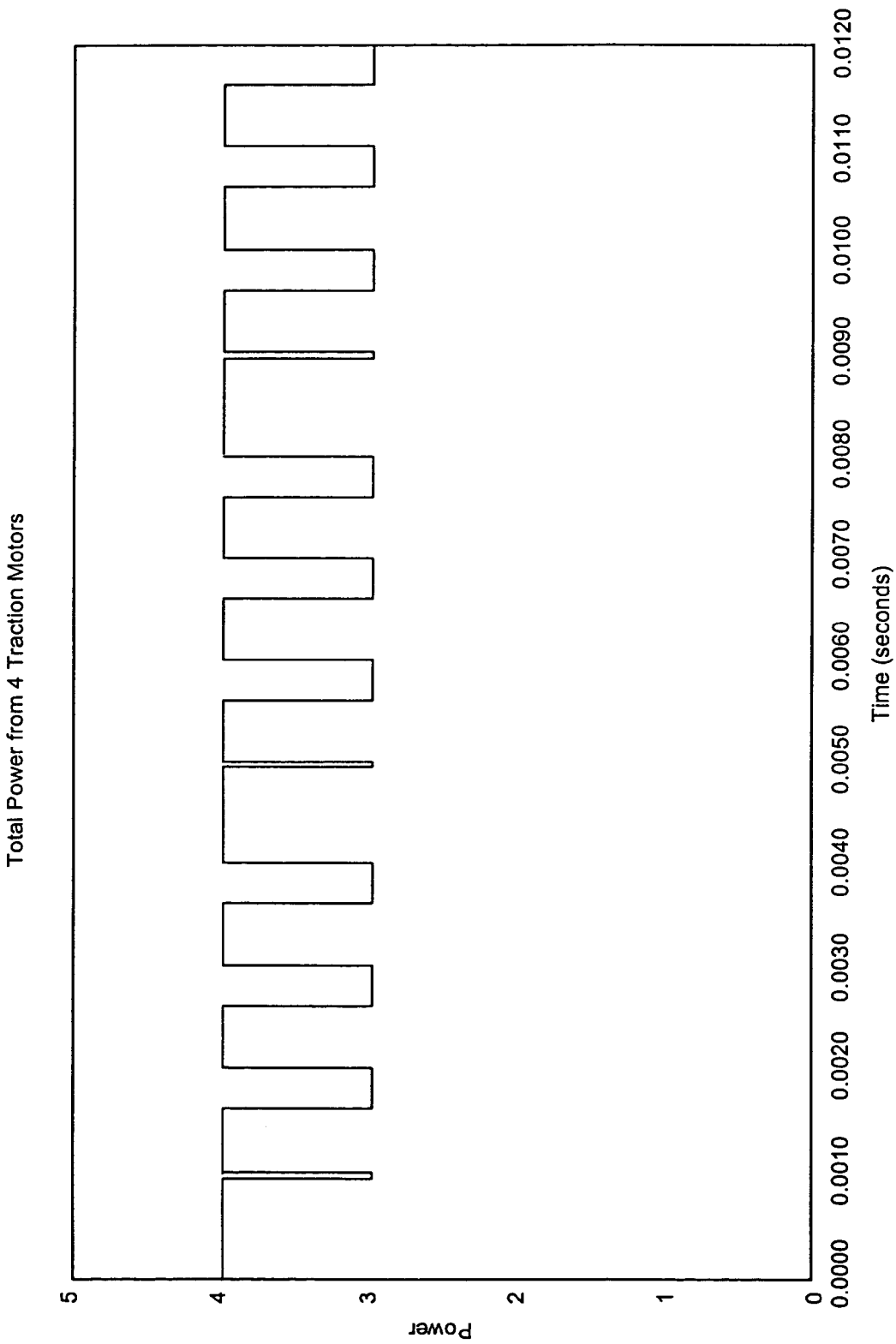

In FIG. 10a, the power pulse to each traction motor is increased to 90% of its maximum possible width. Therefore each pulse is 3.6 milliseconds in width and the pulses overlap enough that the total power to all 4 motors is ranges between three and four times the power output of one motor. In FIG. 10b, the power to motor #2 is reduced by 10% so the pulse width for motor #2 is now 3.24 milliseconds in width while the other 3 motors have pulse widths of 3.6 milliseconds. In FIG. 10c, the power to motor #2 is increased by 10% so the pulse width for motor #2 is now 3.96 milliseconds in width while the other 3 motors have pulse widths of 3.6 milliseconds.

At 100% pulse widths, all motors are operating continuously. In this situation, it is possible to reduce power to one or more motors but not to increase power to any motor since they are all operating continuously at their maximum possible power level.

The percentages of peak locomotive power for each condition represented by FIGS. 5 through 10 are shown in the following table.

| Nominal Pulse Width as a Percentage of Continuous | 10% Power Reduction in Motor #2 Only | All Motors at Equal Power | 10% power Increase Motor #2 Only |
|---|---|---|---|
| 15% | 14.6% | 15.0% | 15.4% |
| 30% | 29.3% | 30.0% | 30.8% |
| 45% | 43.9% | 45.0% | 46.1% |
| 60% | 58.5% | 60.0% | 61.5% |
| 75% | 73.1% | 75.0% | 76.9% |
| 90% | 87.8% | 90.0% | 92.3% |

The pulse widths represented in FIGS. 5 through 10 are the pulse widths sent to the chopper boards to turn the free-wheeling diodes on and off. With the ramping functions applied to the output pulses along with the filters across the DC power supply and across each chopper circuit, the power waveforms sent to each traction motor are smoothed out. Therefore, the technique of incrementally reducing or increasing power pulses from the controller results in a smooth variation of power to the traction motors and hence to the axles.

Traction Motor Relationships

A traction motor and its drive axle can be characterized by motor current, motor RPMs, motor torque, motor power and motor tractive effort. These are all related by well-known mathematical relationships. These are:

Motor Torque=constant1*Motor Power/RPMs

Motor Power=constant2*Motor Tractive Effort*Axle Speed

Axle Speed=constant3*Motor RPMs which leads to:

Motor Torque=constant4*Motor Tractive Effort

These relations apply when the wheels are not slipping or skidding.

In addition, another well-known relation that will be used is:

Adhesion Coefficient=Tractive Effort/Weight on Wheels (expressed as a percent at which the wheels begin to slip or skid. Also, it is noted that the adhesion coefficient for slip may be different than the adhesion coefficient for skid)

The adhesion coefficient is directly related to the coefficients of friction between the wheel and the rail surface.

In a conventional diesel locomotive, the weight of the locomotive can change by approximately 12% as the locomotive consumes fuel. The change of weight on the driving wheels as fuel is consumed can be accounted for and the estimated adhesion coefficient can be adjusted.

Mapping Individual Traction Motor Characteristics

Figure 11:
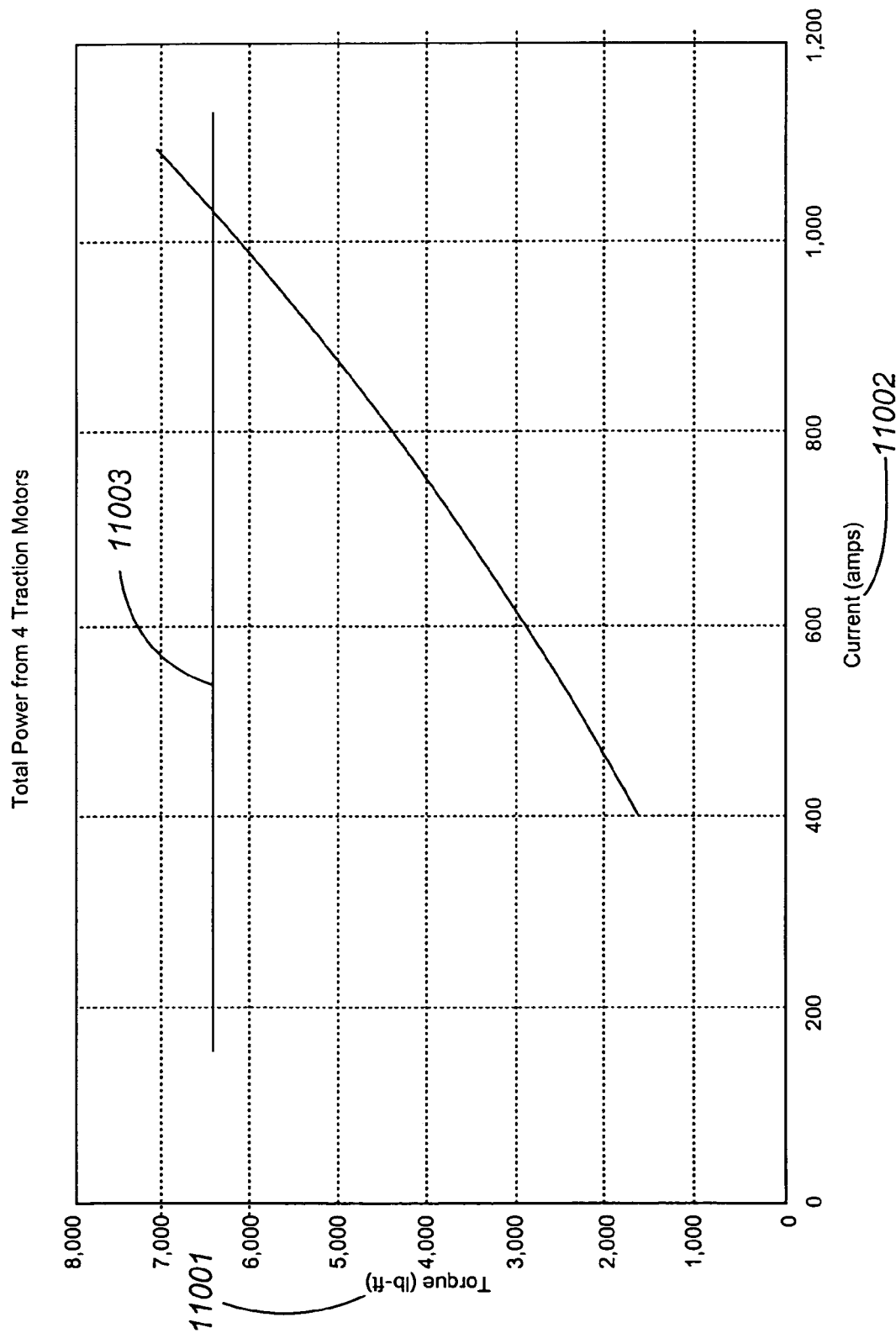
FIG. 11 shows a plot of traction motor torque output versus motor current.

FIG. 11 shows a plot of traction motor torque output 11001 versus motor current 11002. The torque output 11001 by the motor increases as the current 11002 through the traction motor increases. Since tractive effort is proportional to torque, the form of the tractive effort versus motor current is the same.

Lines of constant torque (or tractive effort) 11003 represent lines of constant adhesion factor (or coefficient of friction). FIG. 11 shows one such line of constant adhesion factor 11003. For any torque above this line, wheel slip will occur. In the present invention, each traction motor may have its own unique torque versus motor current curve stored in an on-board memory. These curves may differ slightly from motor to motor because of, for example, differences in motor windings and resistance, differences in motor back emf because of mechanical tolerances, differences in the mechanical linkage from motor to axle and differences in wheel diameter due, for example, wear or manufacture. Motor current may be sensed by any number of current sensing devices such as, for example current-sensing resistors, Hall current sensors, current-sensing transformers, current transducers, Rogowski coils or other common current measuring devices.

Figure 12:
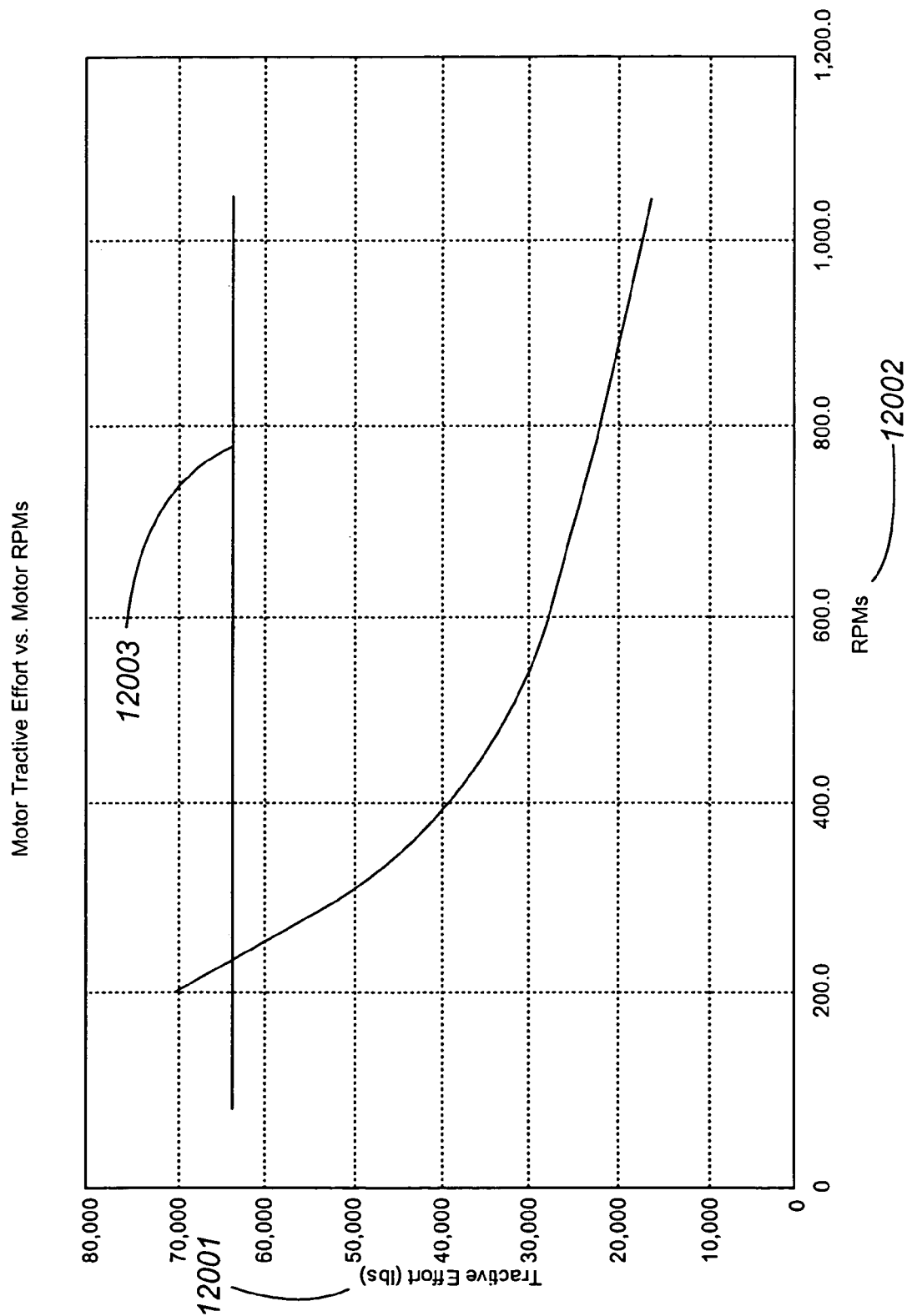
FIG. 12 shows a plot of traction motor tractive effort versus motor rpm

FIG. 12 shows a plot of traction motor tractive effort 12001 versus motor speed 12002. As the rpms of the motor 12002 increase, the tractive effort 12001 output by the motor decreases. Since torque is proportional to tractive effort, the form of the torque versus motor rpms is the same. Lines of constant tractive effort (or torque) 12003 represent lines of constant adhesion factor (or coefficient of friction). FIG. 12 shows one such line of constant adhesion factor 12003. For any tractive effort above this line, wheel slip will occur. In the present invention, each traction motor may have its own unique tractive effort versus motor speed curve stored in an on-board memory. Speed may be expressed in motor rpms or in miles per hour of the wheel along the rail. Rotary speed sensors include tachometers, axle alternators and the like. These indicate the rotational speed of the wheels or axle or traction motor armature. These are all related in a fixed way by the gear ratio and wheel diameter of the truck assembly. For example, motor alternator RPMs are equal to axle RPMs times the gear ratio.

Wheel Slip Detection and Correction

The speed of the locomotive relative to the ground (true ground speed) may be sensed, for example, by a radar system or by a GPS system. When any set of wheels are slipping, their indicated wheel speed should be greater than the true ground speed of the locomotive.

Wheel slip of each axle may be detected by any number of means known to those in the art. These include, for example, detecting an abrupt current or current derivative decrease in the traction motor current or an abrupt increase in the rpms of the traction motor or axle, or a difference between indicated wheel speed and true ground speed, or by any combination of these.

The more preferred means of wheel slip detection is by monitoring the motor current. This is preferred because it does not require additional equipment on the traction motor. A rotary sensor on the traction motor or drive axle is a more direct measurement of wheel slip and is preferred if the motor or axle has a rotary sensor already in place.

Once wheel slip is detected, the controller can take action to terminate the wheel slip, be it synchronous or non-synchronous. For example, the controller can begin an immediate reduction in power to the motor driving the slipping wheels by reducing the power pulse widths in predetermined increments until wheel slip is detected to have ceased. The increments may be expressed as a percentage of the maximum pre-slip current or as a percentage of the previous pulse where the first pulse is the maximum pre-slip current. The pulse width reduction increments are preferably in the range of 5% to 50%, more preferable in the range of 10 to 35% and most preferably in the range of 10 to 20% of the maximum pre-slip current.

The period for detection and corrective action may be carried out automatically by the controller. For a locomotive setup of 4 axles and a chopper frequency of 250 Hz, power pulses are sent to each axle every 4 milliseconds. In this example, the sequence of power pulses can consist of a series of pulses diminishing by 10% of the maximum pre-slip current every 4 milliseconds until wheel slipping ceases. However, the motion of the slipping wheels will be much slower because of the inertia of the wheels and drive train components requiring power reduction to be slower to match the mechanical requirements of the drive train. Nevertheless, the power to the slipping wheels can be reduced rapidly, on a millisecond time scale if necessary.

Figure 13:
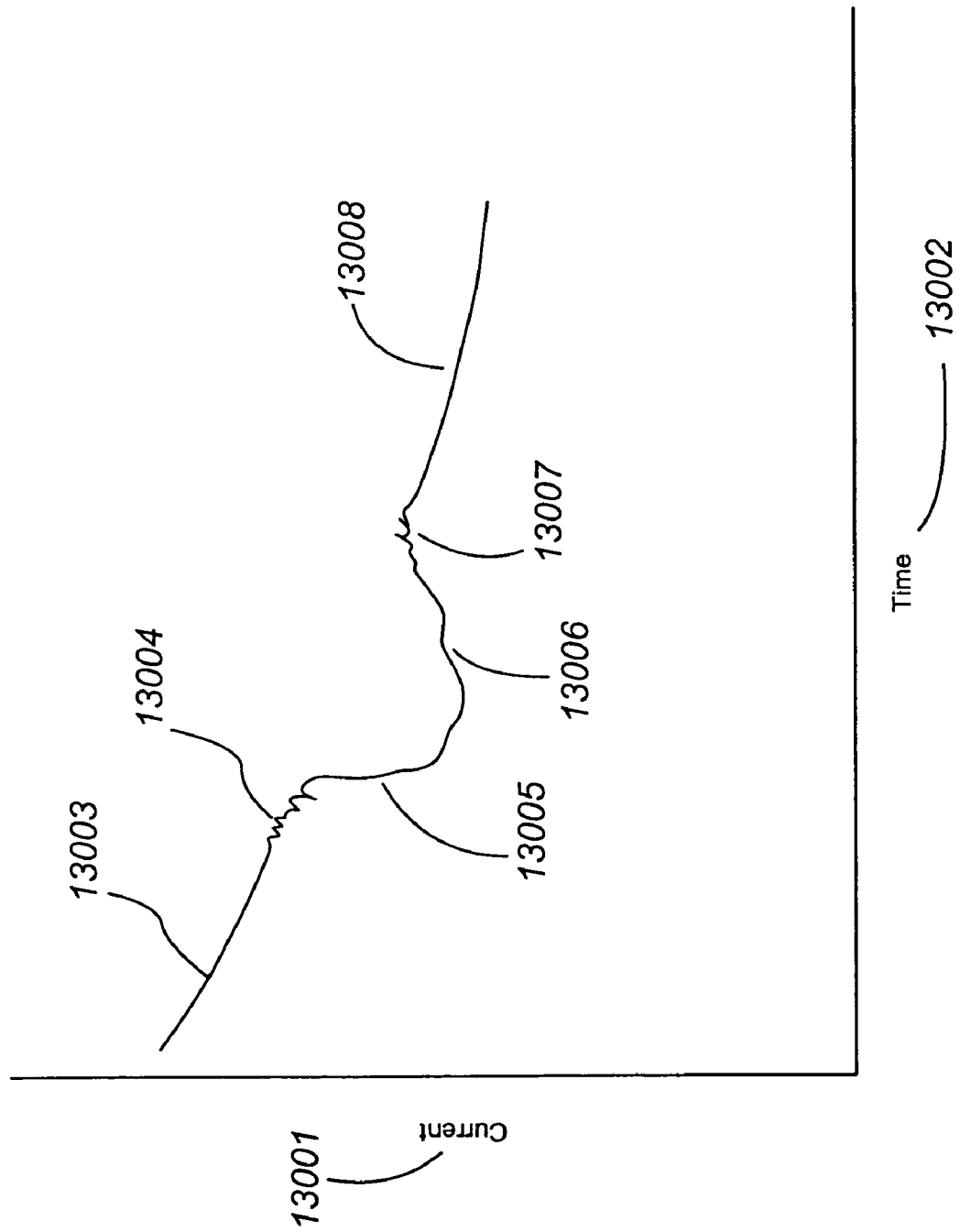
FIG. 13 illustrates a current history of a traction motor illustrating a wheel slip arrest procedure.

An example of a current history of a traction motor reflecting a wheel slip arrest procedure is shown in FIG. 13. In this figure, current 13001 is shown as a function of time 13002. Initially, the current is slowly decreasing 13003 as would be the case for acceleration of the locomotive. Just before the onset of wheel slip, the wheels often make and break contact with the rails and this manifests itself as a phase or period in the current history having a characteristic signature 13004. This characteristic signature can be detected by, for example, sampling the frequency spectrum of the current history and discerning a characteristic frequency response that indicates incipient wheel slip which is sometimes referred to as creep in the adhesion curve. At some time, the wheels slip and the motor rpms increase rapidly causing a greater back emf which, in turn, results in an abrupt reduction 13005 in current. In the present invention, the controller reacts to this by reducing the current to the motor until the wheels stop slipping. As the wheel rpms slow down, the current slowly increases 13006 until traction is re-established 13007 and the current to the motor returns to a value 13008 that is consistent with non-slipping motor torque. That is, the torque and current return to their desired values as determined by the torque versus current curve such as shown in FIG. 11.

The motor torque (or tractive effort) when the current 13004 is just beginning to ripple indicates the adhesion coefficient for the onset of wheel slip. This value, which may be adjusted to include an added safety factor, may be used to adjust the adhesion coefficient where wheel slip may be expected to recur.

Since the tractive effort or torque of each axle is known as a function of motor current and these curves can be stored in an on-board computer, each wheel slip occurrence can be used to give an estimate of adhesion coefficient for that axle/wheel set and that track location. In this way, a database of wheel slip conditions can be built up and stored for future use.

Figure 14:
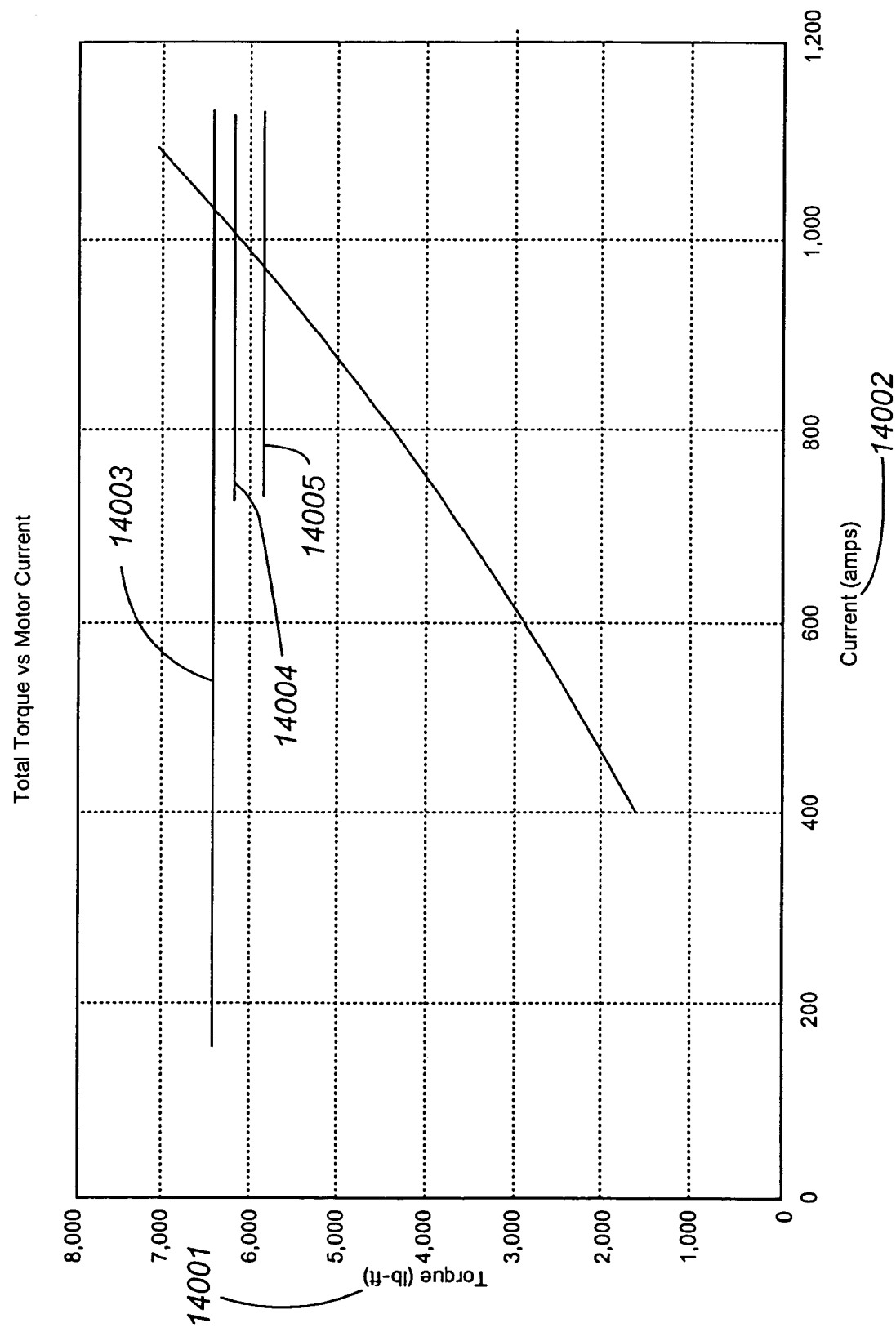
FIG. 14 shows an example of a motor torque effort versus motor current curve where the level of the wheel slip adhesion coefficient is modified.

An example of such a curve is shown in FIG. 14. FIG. 14 shows motor torque 14001 versus motor current 14002. At the beginning of an operation, the adhesion limit 14003 for wheel slip is shown. If wheel slip occurs prior to the limit 14003, then a new torque or tractive effort limit 14004 is determined from the current monitoring device such as depicted in FIG. 13. If wheel slip continues to recur, then the adhesion limit can be further reduced to a new value 14005.

Deliberately Inducing Wheel Slip to Determine Adhesion

The ability to slightly increase or reduce power to individual axles can be used to induce wheel slip for purposes of establishing an adhesion coefficient. At the desired time, the controller can increase power to a selected motor by increasing the power pulse widths in predetermined increments until wheel slip is detected to have occurred. The increments may be expressed as a percentage of the maximum pre-slip current or as a percentage of the previous pulse where the first pulse is the maximum pre-slip current. The pulse width increase increments are preferably in the range of 1% to 25%, more preferably in the range of 1 to 15% and most preferably in the range of 1 to 5% of the maximum pre-slip current. Once wheel slip is detected, the adhesion coefficient is recorded and wheel slip is terminated by returning the current to the pre-wheel slip level. If the wheels continue to slip, then the wheel slip control logic described above is automatically activated until wheel slip is terminated. This process can be used to update the adhesion limits such as shown in FIG. 14.

Deliberately Inducing Wheel Slip to Condition Rail Surface

The ability to slightly increase or reduce power to individual axles can be used to induce wheel slip for purposes of conditioning the rails. For example, if the rails are oily or wet or corroded, preferably the leading set of wheels or less preferably any other set of wheels, can be made to slip in a controllable manner so as to reduce or remove, oil, water, ice or corrosion from the rails to increase the adhesion coefficient of the rails for the trailing wheel sets. At the desired time, the controller can increase power to a selected motor by increasing the power pulse widths in predetermined increments until wheel slip is detected to have occurred. The increments may be expressed as a percentage of the maximum pre-slip current or as a percentage of the previous pulse where the first pulse is the maximum pre-slip current. The pulse width increase increments are preferably in the range of 5% to 35%, more preferably in the range of 10 to 25% and most preferably in the range of 10 to 15% of the maximum pre-slip current. Once wheel slip is detected, the wheels may be allowed to slip for a predetermined time so as to increase the adhesion coefficient of the track. Wheel slip is terminated by returning the current to the pre-wheel slip level. If the wheels continue to slip, then the wheel slip control logic described above automatically activates until wheel slip is terminated. Again, the adhesion coefficient can be recorded and added to the data base stored in the on-board computer memory.

Logic for Preempting Wheel Slip

The ability to slightly increase or reduce power to individual axles can be used as the basis for a strategy of minimizing the occurrence of, or preempting wheel slip. The strategy includes one or more computer-stored motor torque versus motor current or motor rpm curves; or a tractive effort versus motor current or motor rpm curve characteristic of each driving axle. These curves, once generated, are relatively stable and unchanging over time. From the data base of wheel slip history and known track adhesion coefficients, a band can be constructed on these curves, that represents the region where wheel slip has occurred in the past. An example of such a curve was shown in FIG. 14 which shows motor torque 14001 versus motor current 14002. The region between the maximum and minimum adhesion curves 14003 and 14005 can be considered as a band or region where the onset of wheel slip is known to occur.

If wheel slip continues to occur, the adhesion limit curve 14005 can be further lowered. Conversely, if wheel slip does not recur for a substantial time, the controller can induce wheel slip such as described above and can determine that the adhesion coefficient can be moved upward (higher torque value) on the torque versus current curve.

The wheel slip onset regions can be varied for different track locations and different conditions on the tracks and stored in the memory of an on-board computer for future reference.

Figure 15:
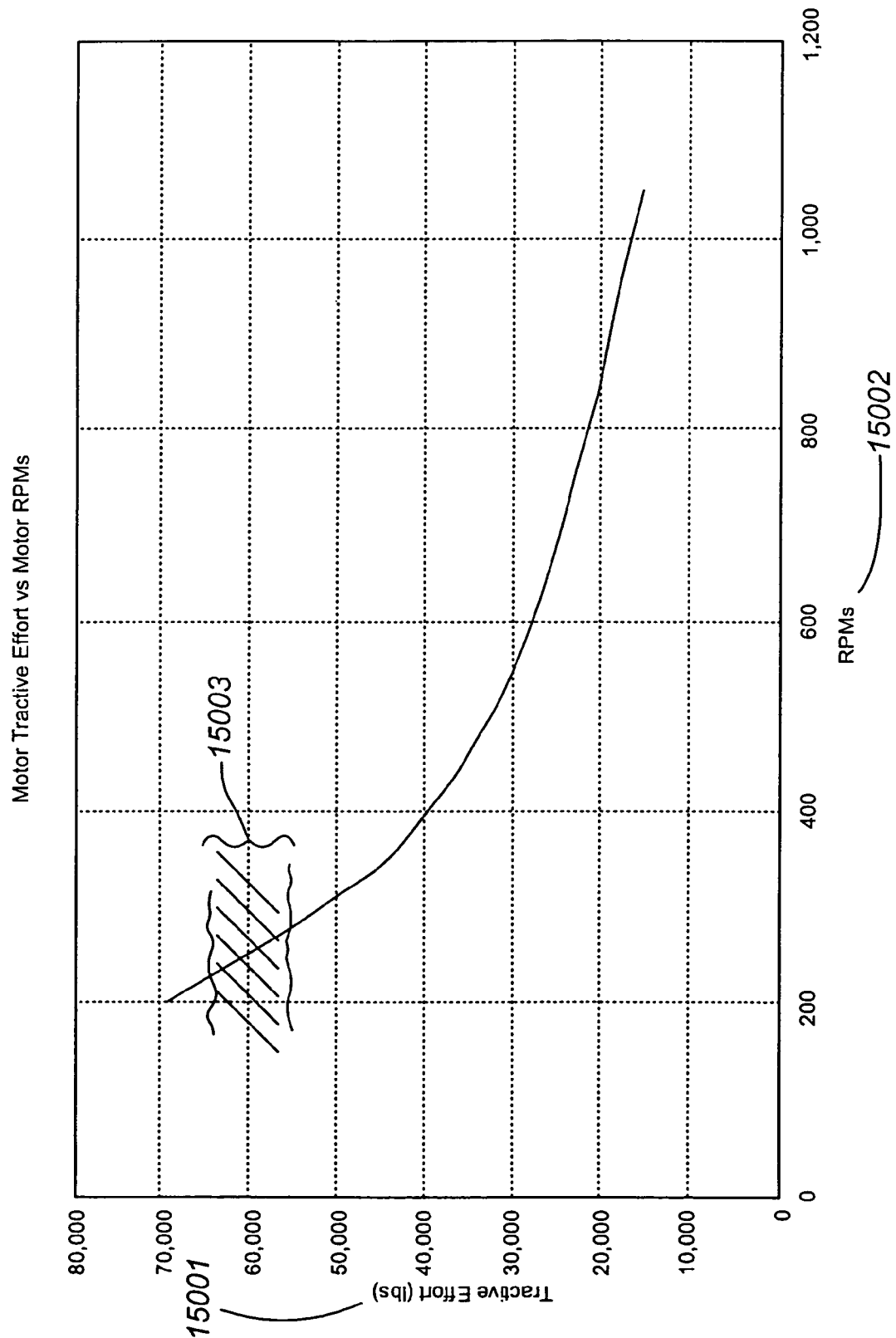
FIG. 15 shows an example of a motor tractive effort versus motor rpm curve with a region of track adhesion coefficients in and above which wheel slip may occur.

FIG. 15 shows an example of a motor tractive effort 15001 versus motor rpm 15002 curve with a region 15003 of track adhesion coefficients in and above which wheel slip may occur. This region may be established for each traction motor/axle combination and may be generated by past experience, past knowledge of a particular section of track or by inducing wheel slip to establish adhesion coefficients.

Figure 16:
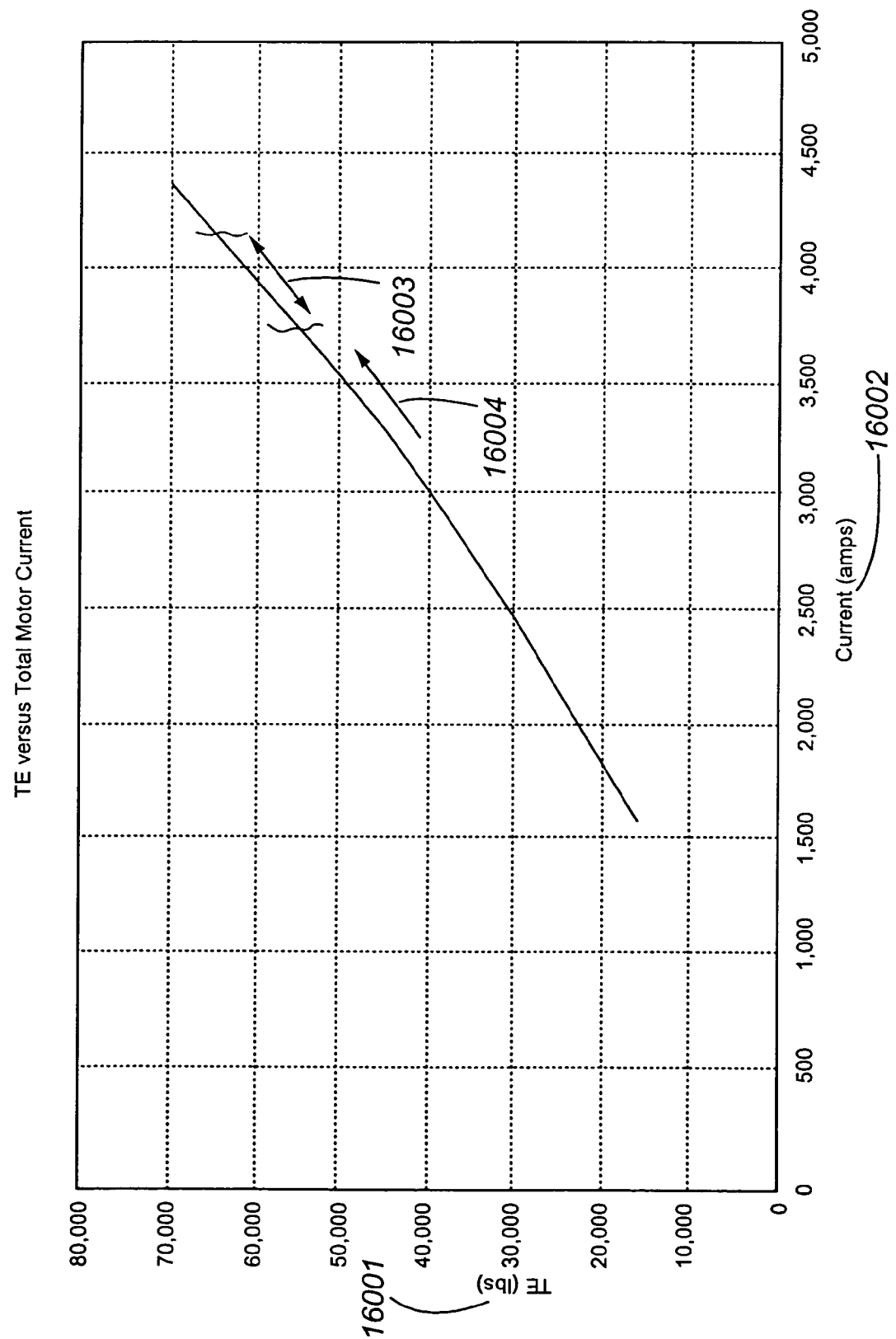
FIG. 16 shows an example of a motor tractive effort versus motor current for current approaching the region in and above which wheel slip may occur.

The range of tractive effort defined by the range of adhesion coefficients illustrated in FIG. 15 can be shown as a corresponding range on the plot of tractive effort versus motor current such as shown in FIG. 16 which shows motor tractive effort 16001 versus motor current 16002 for current approaching the region 16003 in and above which wheel slip may occur. As the tractive effort is increased 16004, the controller monitors the approach of tractive effort to the region 16003 of known wheel slip occurrence and then ensures that the rate of application of power (or tractive effort) to that drive axle is slowed by a predetermined algorithm as the adhesion limit is approached. If wheel slip is detected, the level of tractive effort at which it occurs is recorded and the wheel slip control logic described above automatically activates until wheel slip is terminated. The level of the wheel slip adhesion coefficient is then lowered to reflect new wheel slip conditions and the adhesion region is appropriately updated.

Figure 17:
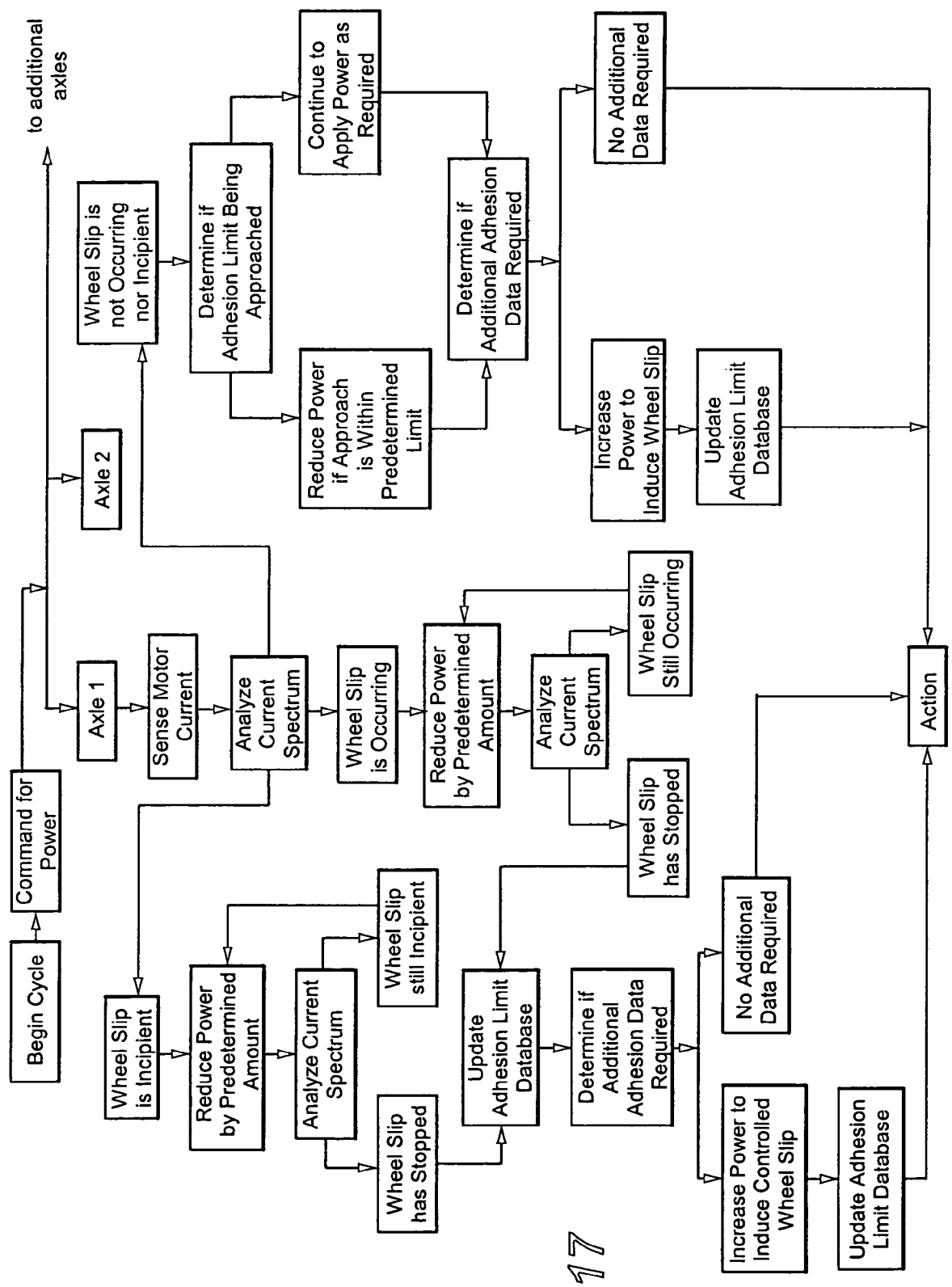
FIG. 17 shows the logic flow for wheel slip control including preemptive action is taken.

An example of programmable and automated logic for wheel slip control including preemptive action is shown in FIG. 17. When power is applied, each traction motor is examined in turn. For each motor:

motor current is measured the motor current spectrum is analyzed if wheel slip is determined to be incipient power is reduced by a predetermined amount the motor current spectrum is analyzed if wheel slip is still incipient, reduce power again until no longer incipient once wheel slip has ceased, update the adhesion data base
determine if additional adhesion data is required
if additional data is required, induce wheel slip
end of cycle
if wheel slip is determined to be occurring
   power is reduced by a predetermined amount
   the motor current spectrum is analyzed
      if wheel slip is still occurring, reduce power again until no longer occurring
once wheel slip has ceased, update the adhesion data base
determine if additional adhesion data is required
if additional data is required, induce wheel slip
end of cycle
if wheel slip is determined not to be incipient nor occurring
determine if adhesion limit is being approached
if limit is being approached, reduce power to a predetermined limit
determine if additional adhesion data is required
if additional data is required, induce wheel slip
end of cycle The foregoing example is one of numerous variants of logic to manage and preempt wheel slip. This level of wheel slip management and preemption is only possible if the power to each individual traction motor can be slightly increased or decreased independently, as is possible in the present invention.

Figure 18:
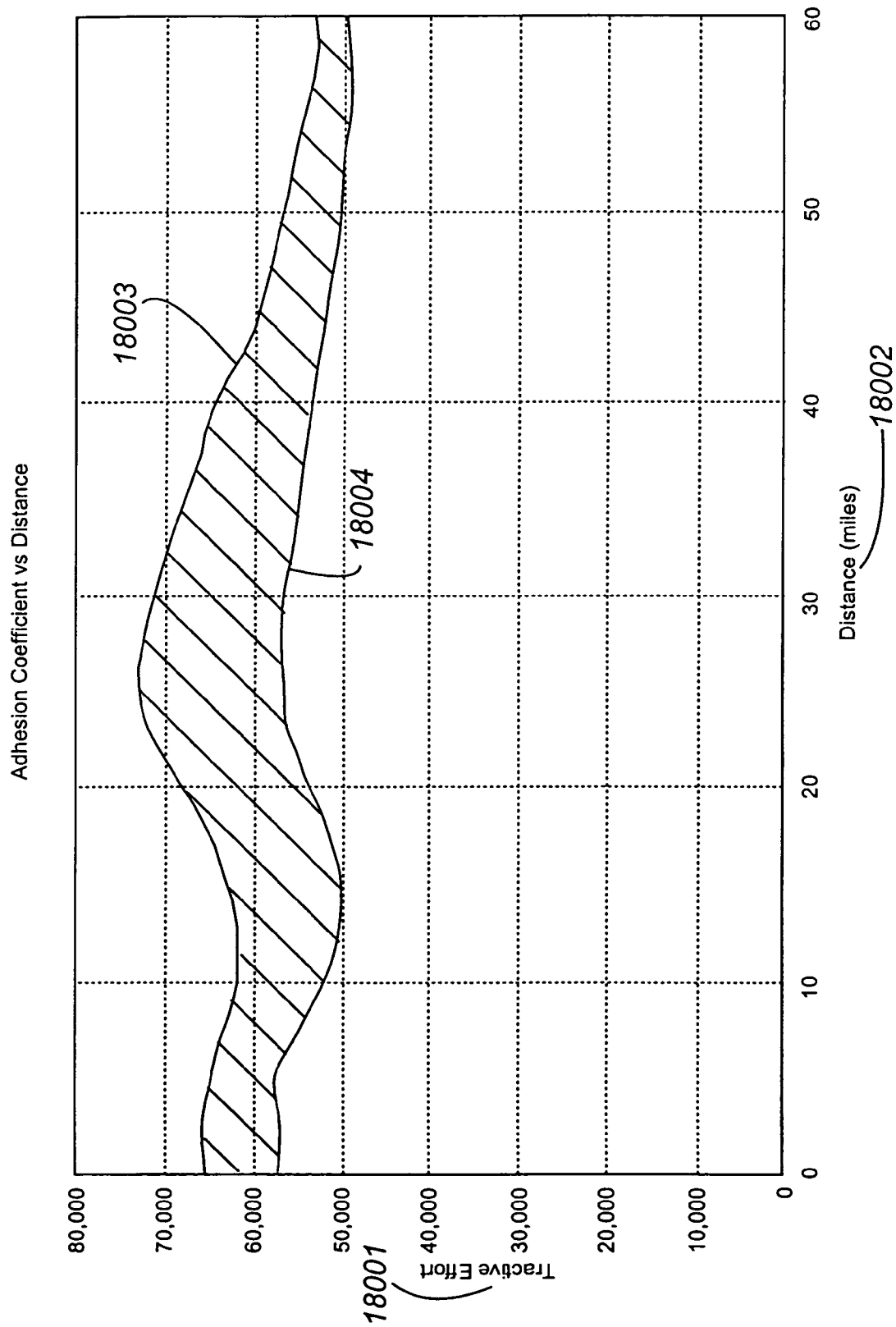
FIG. 18 shows an example of tractive effort versus distance along the track with a band of wheel slip adhesion coefficients.

FIG. 18 illustrates an example of tractive effort 18001 versus distance 18002 map of wheel slip adhesion coefficients. Such a map can be developed by saving data from wheel slip occurrences, known data and data generated by inducing wheel slip such as described above as part of the present invention. FIG. 18 shows two tractive effort adhesion curves. The higher curve 18003 represents tractive effort above which wheel slip always occurs. The lower curve 18004 represents tractive effort above which wheel slip or the onset of wheel slip may occur. This map can be used as part of the preemptive wheel slip management strategy described in FIG. 17.

In yet another aspect of the preempting logic (not shown in FIG. 18), if the adhesion coefficient is determined to be low or becoming low or if tractive effort is approaching the adhesion limit, then rail sanders can be activated automatically to increase adhesion or traction, thereby preempting or at least further forestalling wheel slip.

Braking

If the wheels on one or more of the drive axles is determined to be skidding during braking, then the power to the traction motor driving that axle experiencing wheel skid can be increased in small, predetermined increments until the cessation of wheel skid is detected. Power is incrementally increased to individual motors in the case of differential wheel skid and power to all the drive axles is incrementally increased in the case of synchronous wheel skid. This improvement in braking control is not possible with the method disclosed in U.S. Pat. No. 6,012,011 in which the power to an individual drive axle can only be completely switched off.

It is also possible to apply a small voltage to all motors during braking at low speed (typically less than 15 mph) such that the applied voltage is approximately the same as the back emf on the traction motors. If a wheel or wheels skids, then the back emf will drop to zero and the small applied voltage will drive a substantial current through the motors and produce a high torque that will act to unlock the skidding wheel or wheels. If one of more wheels do not unlock, then the applied voltage (and hence power) can be increased on the locked wheels to further increase the torque which tends to unlock the wheels. It is understood that the applied voltage would automatically be maintained at approximately the same as the back emf on the traction motors as the locomotive speed decreases during braking. The preferred method of monitoring the applied voltage is to monitor the traction motor current although the voltage across the motor could also be monitored. When the locomotive comes to a complete stop, the applied voltage is turned off so that the locomotive will not tend to accelerate once the brakes are released.

The methods and concepts discussed above for control of wheel slip can be applied to wheel skid during braking. In addition, by monitoring motor current such as shown in FIG. 13 above and/or monitoring armature voltage and axle rpms, the detection of wheel skid can be utilized to update adhesion coefficients. In order to monitor motor current during braking, a small level of positive power can be applied to the traction motors during braking to act as a means of detection of wheel skid or lock-up. The small amount of positive power will require a small amount of additional braking but will provide field current to the traction motor which can be used to detect wheel skid. It is also possible to detect the onset of wheel skid by monitoring the current in a traction motor. When a wheel begins to skid, the traction motor armature ceases to rotate, there is an abrupt rise in motor current and the commutator noise disappears from the current trace. These behaviors can be detected and used to determine the onset of wheel skid. The ability to control wheel skid on individual wheel sets is of benefit especially for quickly reacting to the onset of skid and thereby minimizing or preventing the development of flat spots on the skidding wheels.

An adhesion coefficient appropriate to wheel skid can be determined by inducing wheel skid for a brief period (a period brief enough to prevent any wheel flattening). This can be done by applying a small amount of power to all traction motors during braking and then reducing power to a selected traction motor until a wheel or wheels on its corresponding wheel set begins to skid. The power can then be immediately restored to its pre-skid level.

Figure 19:
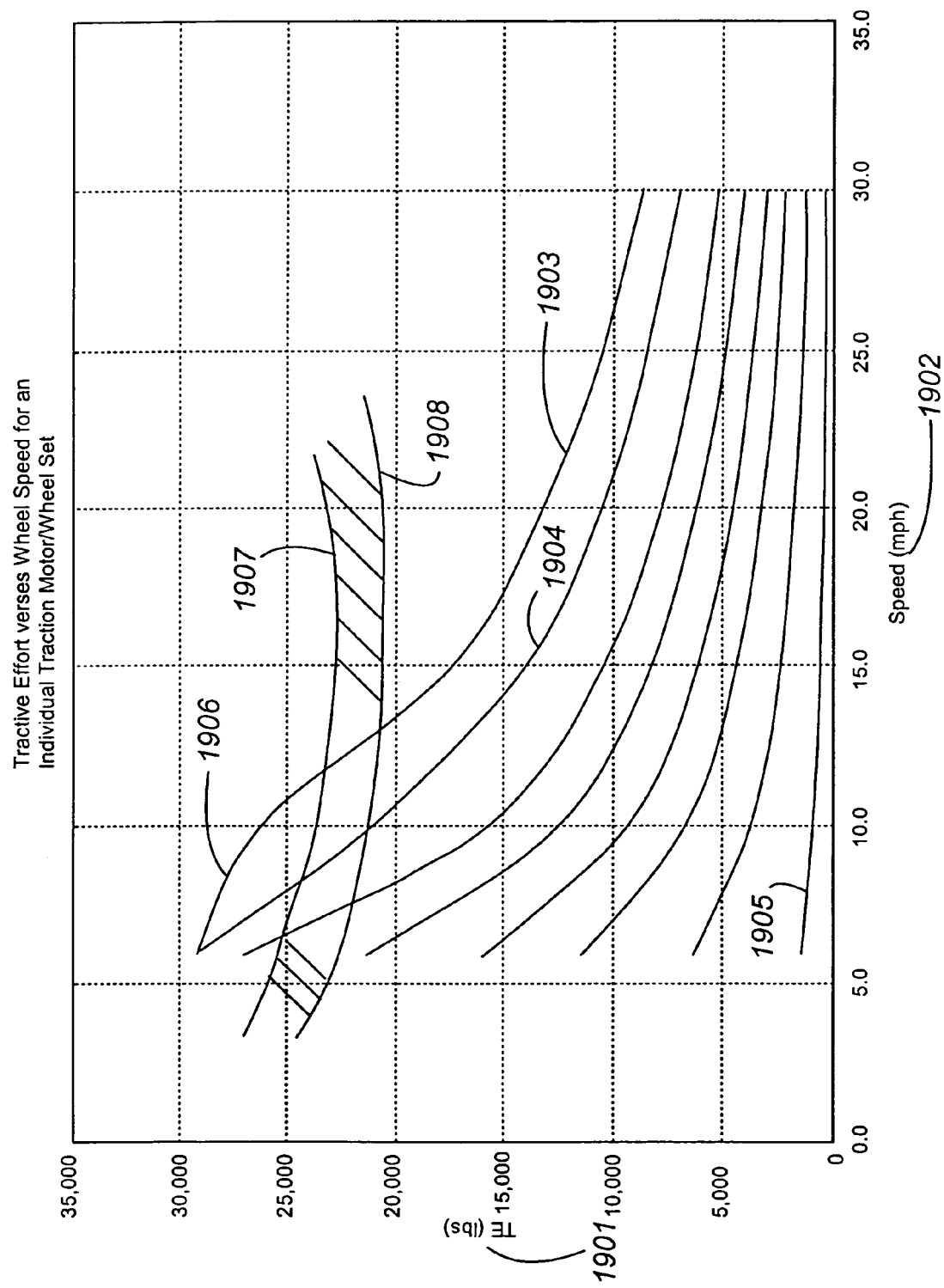
FIG. 19 shows a plot of a family of traction motor tractive effort curves versus wheel speed.

FIG. 19 shows a plot of a set of traction motor tractive effort curves versus wheel or axle speed (which is directly related to wheel rpm or traction motor rpm). Most locomotives operate using a set of approximately constant power curves commonly called notch settings. For motoring, there are usually eight power or notch settings that may be selected by the locomotive engineer. When motor current exceeds a predetermined limit, the power may be limited so that a portion of a curve may not represent constant power. FIG. 19 shows tractive effort 1901 versus wheel speed 1902 for a series of approximately constant power curves. For example, curve 1903 is the highest power setting (notch 8) and illustrates a current limit 1906 at low speeds. Curve 1904 is a lower power curve and is notch 7. Curve 1905 is the lowest power curve and is notch 1. An adhesion coefficient band represents the region below whose lower boundary 1908 there is no wheel slip and above whose upper boundary 1907 there is always wheel slip. As can be seen, each of the eight power curves in this example passes through the adhesion coefficient band at a different wheel speed. The adhesion coefficients are shown as being different with locomotive speed. At a tractive effort below the adhesion coefficient band, there is typically no wheel slip. At a tractive effort above the adhesion coefficient band, wheel slip is in an uncontrolled or runaway condition which is characterized in the motoring mode by one or more spinning wheel sets and in the braking mode by one or more skidding wheel sets. Within the adhesion coefficient band, wheel slip is within the region of friction creep where wheel slip is controllable and where some wheels may slip (especially the leading wheels) and some may not. Maximum tractive or braking effort is obtained if each powered wheel of the vehicle is rotating at such an angular velocity that its actual peripheral speed is slightly higher (motoring) or slightly lower (braking) than the true locomotive speed. The difference between wheel speed and true speed may be referred to as slip speed or creep. There is a value of slip speed at which optimum tractive or braking effort occurs which depends on locomotive speed, rail, grade and environmental conditions. As long as optimum slip speed is not exceeded, the locomotive will operate in a stable microslip or creep mode. The flexibility of individually controlling power to the traction motors allows more precise control and permits all the driving wheels to operate near the optimum slip speed under all conditions.

A number of variations and modifications of the invention can be used. It would be possible to provide for some features of the invention without providing others. For example in one alternative embodiment, wheel slip can be detected and terminated by slightly decreasing power to the slipping wheel without measuring an adhesion coefficient and without predicting or preempting future occurrences of wheel slip. In another alternative embodiment, wheel skid can be detected and terminated by slightly increasing power to the skidding wheel without measuring an adhesion coefficient and without predicting or preempting future occurrences of wheel skid.

The present invention, in various embodiments, includes components, methods, processes, systems and/or apparatus substantially as depicted and described herein, including various embodiments, subcombinations, and subsets thereof Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) receiving a requested notch setting from a locomotive operator, the requested notch setting providing more power to a plurality of traction motors than a current notch setting;
   (b) in response to the receiving step (a), determining whether wheel slip is likely for at least one wheel if the notch setting is implemented; and
   (c) when wheel slip is likely to occur, at least one of:
      (i) implementing the requested notch setting but adjusting at least one of a current level and a power level associated with the requested notch setting to inhibit the onset of wheel slip to the at least one wheel; and
      (ii) ignoring the requested notch setting and maintaining the current notch setting.

2. The method of claim 1, wherein step (i) is performed, wherein a wheel driven by a first traction motor has a different adhesion factor than a wheel driven by a second traction motor, and determining step (b) is performed for each of the plurality of traction motors and further comprising:
   for each of the plurality of traction motors, adjusting a corresponding power level to inhibit the onset of wheel slip in at least one wheel associated with the respective traction motor, whereby at least first and second traction motors receive different power levels at the requested notch setting.

3. The method of claim 1, wherein step (i) is performed and determining step (b) is performed for each of the plurality of traction motors and further comprising:
   adjusting at least one of a current level and a power level supplied to the traction motors to inhibit the onset of wheel slip in at least one wheel associated with one of the traction motors, whereby the traction motors each receive a common power level at the requested notch setting.

4. The method of claim 1, wherein step (ii) is performed.

5. The method of claim 1, wherein the determining step (b) comprises the substeps:
   comparing at least one of (i) a torque associated with the requested notch setting, (ii) a traction motor electrical current and/or current derivative associated with the requested notch setting, (iii) a tractive effort associated with the requested notch setting, and (iv) a traction motor speed associated with the requested notch setting with a determined set of variables comprising a respective one of (i) a torque, (ii) a traction motor electrical current and/or current derivative, (iii) a tractive effort, and (iv) a traction motor speed indicating when wheel slip is likely to occur; and
   when the at least one of (i) a torque associated with the requested notch setting, (ii) a traction motor electrical current and/or current derivative associated with the requested notch setting, (iii) a tractive effort associated with the requested notch setting, and (iv) a traction motor speed associated with the requested notch setting has a predetermined relationship with the respective one of (i) a torque, (ii) a traction motor electrical current and/or current derivative , (iii) a tractive effort, and (iv) a fraction motor speed in the determined set of variables, the predetermined relationship indicating that wheel slip is likely to occur, step (c) is performed.

6. The method of claim 5, wherein a tractive effort associated with the requested notch setting is compared with the determined set of variables.

7. The method of claim 5, wherein a traction motor electrical current associated with the requested notch setting is compared with the determined set of variables.

8. The method of claim 5, wherein an axle speed associated with the requested notch setting is compared with the determined set of variables.

9. The method of claim 5, wherein a traction motor speed associated with the requested notch setting is compared wit the determined set of variables.

10. The method of claim 5, wherein the determined set of variables is derived from an operational wheel slip history of the locomotive.

11. The method of claim 5, wherein a first set of variables corresponds to a first set of locomotive speed, track and/or environmental conditions and a second set of variables corresponds to a second different set of locomotive speed, track and/or environmental conditions and wherein the determining step (b) comprises:
selecting an appropriate set of variables for the current locomotive speed, track and/or environmental conditions.

12. A logic circuit operable to perform the steps of claim 5.

13. A locomotive, comprising:
(a) an operator interface operable to receive a requested notch setting from a locomotive operator, the requested notch setting providing more power to a plurality of traction motors than a current notch setting;
(b) a controller operable to determine, in response to the requested notch setting, whether wheel slip is likely for at least one wheel if the notch setting is implemented and, when wheel slip is likely to occur, cause the performance of at least one of the following operations:
  (i) implementing the requested notch setting but adjusting at least one of a current level and a power level associated with the requested notch setting to inhibit the onset of wheel slip; and
  (ii) ignoring the requested notch setting and maintaining the current notch setting.

14. The locomotive of claim 13, wherein operation (i) is performed, wherein a wheel driven by a first traction motor has a different adhesion factor than a wheel driven by a second traction motor, wherein the determining operation is performed for each of the plurality of traction motors and wherein the controller is further operable, for each of the plurality of traction motors, to adjust a corresponding power level to inhibit the onset of wheel slip in at least one wheel associated with the respective traction motor, whereby at least first and second traction motors receive different power levels at the requested notch setting.

15. The locomotive of claim 13, wherein operation (i) is performed and the determining operation is performed for each of the plurality of traction motors and wherein the controller is further operable to adjust a power level supplied to the traction motors to inhibit the onset of wheel slip in at least one wheel associated with one of the traction motors, whereby the traction motors each receive a common power level at the requested notch setting.

16. The locomotive of claim 13, wherein operation (ii) is performed.

17. The locomotive of claim 13, wherein the determining operation comprises the suboperations of:
comparing at least one of (i) a torque associated wit the requested notch setting, (ii) a traction motor electrical current and/or current derivative associated with the requested notch setting, (iii) a tractive effort associated wit the requested notch setting, and (iv) a traction motor speed associated with the requested notch setting with a determined set of variables comprising a respective one of (i) a torque, (ii) a traction motor electrical current and/or current derivative, (iii) a tractive effort, and (iv) a traction motor speed indicating when wheel slip is likely to occur; and
when the at least one of (i) a torque associated with the requested notch setting, (ii) a traction motor electrical current associated with the requested notch setting, (iii) a tractive effort associated with the requested notch setting, and (iv) a traction motor speed associated with the requested notch setting has a predetermined relationship with the respective one of (i) a torque, (ii) a traction motor electrical current, (iii) a tractive effort, and (iv) a traction motor speed in the determined set of variables, the determined relationship indicating that wheel slip is likely to occur, step (c) is performed.

18. The locomotive of claim 17, wherein a tractive effort associated with the requested notch setting is compared with the determined set of variables.

19. The locomotive of claim 17, wherein a traction motor electrical current associated with the requested notch setting is compared with the determined set of variables.

20. The locomotive of claim 17, wherein an axle speed associated with the requested notch setting is compared with the determined set of variables.

21. The locomotive of claim 17, wherein a traction motor speed associated with the requested notch setting is compared with the determined set of variables.

22. The locomotive of claim 17, wherein the set of variables is derived from an operational wheel slip history of the locomotive.

23. The locomotive of claim 17, wherein a first set of variables corresponds to a first set of locomotive speed, track and/or environmental conditions and a second set of variables corresponds to a second different set of locomotive speed, track and/or environmental conditions.

24. A method, comprising:
(a) in a locomotive comprising a plurality of fraction motors, each driving a plurality of wheels, monitoring at least one traction motor and/or at least one wheel driven by the at least one traction motor for the occurrence of at least one of wheel slip and wheel skid;
(b) when the at least one of wheel slip and wheel skid occurs, determining an operating characteristic in effect at a selected point before and/or during the occurrence of the at least one of wheel slip and wheel skid; and
(c) using the operating characteristic to predict a later possible occurrence of the at least one of wheel slip and wheel skid.

25. The method of claim 24, wherein the at least one of wheel slip and wheel skid is wheel slip.

26. The method of claim 25, wherein the monitoring step comprises:
incrementally increasing power to a selected fraction motor until wheel slip occurs to a wheel driven by the selected traction motor, whereby a set of operating characteristics characterizing the onset of wheel slip conditions may be generated;

upon the occurrence of wheel slip, reducing the wheel slip to a predetermined acceptable level by decreasing the power to a pre-wheel slip level.

27. The method of claim 25, wherein steps (a) and (b) are performed for each of the traction motors and wherein the operating characteristic is an adhesion coefficient.

28. The method of claim 27, wherein each traction motor has a respective adhesion coefficient characterizing at least one of the onset of wheel slip and the attainment of the optimum value of slip speed and wherein at least two traction motors have different adhesion coefficients.

29. The method of claim 27, wherein each of the adhesion coefficients is adjusted in magnitude by a safety factor and wherein each traction motor has a respective plurality of adhesion coefficients, each of which is associated with different locomotive speeds, track and/or climatic conditions.

30. The method of claim 25, wherein the at least one traction motor is the front traction motor and further comprising:
maintaining wheel slip for a time sufficient to condition a rail section over which the locomotive passes.

31. The method of claim 24, wherein, during a first time interval, steps (a) and (b) are performed for a first traction motor, wherein, during a second later time interval, steps (a) and (b) are performed for a second traction motor, and wherein the first and second time intervals are discrete from one another.

32. The method of claim 24, wherein the at least one of wheel slip and wheel skid is wheel skid.

33. The method of claim 32, wherein the determining step comprises the substep of:
detecting the operating characteristic of each of the plurality of traction motors and/or at least one wheel driven by each of the plurality of traction motors; and wherein the operating characteristic is at least one of (i) an armature voltage of the corresponding traction motor, (ii) a rotational speed of one wheel driven by the corresponding traction motor, (iii) a rotational speed of the corresponding traction motor, (iv) a current and/or current derivative history of the corresponding traction motor, and (v) a commutator signature in the current of the corresponding traction motor, and wherein the determining step comprises at least one of:
(i) detecting an abrupt decrease to zero of the armature voltage of an individual traction motor,
(ii) detecting an abrupt decrease to zero in the revolutions-per-minute (rpms) of an individual an individual traction motor,
(iii) detecting an abrupt decrease to zero in the revolutions-per-minute (rpms) of an individual wheel or axle,
(iv) detecting an abrupt increase in the traction motor current or current time derivative, (v) detecting the disappearance of commutator noise in the traction motor current, and (vi) determining when a wheel speed has stopped relative to the true ground speed of the locomotive.

34. The method of claim 32, wherein a sensor independently monitors each of the traction motors and wherein the monitoring step comprises the substep of:
determining that the operating characteristic of the first traction motor has a predetermined relationship with an operating characteristic setpoint; and further comprising:
comparing a detected operating characteristic detected for each of the traction motors to the operating characteristic setpoint and wherein, when the detected operating characteristic has the predetermined relationship with the operating characteristic setpoint, the at least one wheel of the corresponding traction motor is determined to be experiencing wheel skid.

35. The method of claim 32, wherein the operating characteristic is an adhesion coefficient, wherein each traction motor has a respective adhesion coefficient characterizing the onset of wheel skid and wherein at least two traction motors have different adhesion coefficients.

36. A locomotive, comprising:
a plurality of traction motors, each driving a plurality of wheels;
a sensor operable to monitor at least one traction motor and/or at least one wheel and/or at least one axle driven by the at least one traction motor for the occurrence of wheel slip; and
a controller operable to (i) predict the onset of wheel slip; (ii) when wheel slip is likely to occur, implement an action to inhibit the onset of wheel slip; (iii) when wheel slip occurs, determine an adhesion coefficient in effect at a selected point before and/or during the occurrence of wheel slip and use the adhesion coefficient to predict the onset of wheel slip, wherein the monitoring operation comprises the sub-operation of (a) incrementally increasing power to a selected traction motor until wheel slip occurs to a wheel driven by the selected traction motor, whereby a set of adhesion coefficients characterizing the onset of wheel slip conditions may be generated.

37. The locomotive of claim 36, wherein the monitoring operation comprises the sub-operation of, upon the occurrence of wheel slip, terminating the wheel slip by decreasing the power to a pre-wheel slip level.

38. The locomotive of claim 36, wherein the sensor independently monitors each of the traction motors.

39. The locomotive of claim 36, wherein each traction motor has a respective adhesion coefficient characterizing the onset of wheel slip and wherein at least two traction motors have different adhesion coefficients.

40. The locomotive of claim 36, wherein each of the adhesion coefficients is adjusted in magnitude by a safety factor and wherein each traction motor has a respective plurality of adhesion coefficients, each of which is associated with different locomotive speed, track and/or climatic conditions.

41. The locomotive of claim 36, wherein the at least one traction motor is the front traction motor and wherein the controller maintains wheel slip for a time sufficient to condition a rail section over which the locomotive passes.

42. The locomotive of claim 36, wherein the controller is operable, when wheel skid occurs, to determine an adhesion coefficient in effect at a selected point before and/or during the occurrence of wheel skid and use the adhesion coefficient to predict the onset of wheel skid.

* * * * *